United States Patent [19]
Kumagai et al.

[11] Patent Number: 5,917,299
[45] Date of Patent: Jun. 29, 1999

[54] MOTOR DRIVE CONTROL DEVICE

[75] Inventors: Katsuhide Kumagai; Kanichi Tanaka; Yousuke Obata; Shigeji Ito; Noboru Mizukami; Osamu Inagaki, all of Niwa, Japan

[73] Assignee: Kabushiki Kaisha Tokai-Rika-Denki-Seisakusho, Niwa, Japan

[21] Appl. No.: 08/804,122

[22] Filed: Feb. 20, 1997

[30] Foreign Application Priority Data

Feb. 29, 1996 [JP] Japan .................................. 8-043457

[51] Int. Cl.⁶ ...................................................... H02P 3/00
[52] U.S. Cl. .......................... 318/466; 318/469; 318/281
[58] Field of Search ...................... 318/280–293, 318/138, 139, 440–449; 361/20–32; 340/661

[56] References Cited

U.S. PATENT DOCUMENTS

| | | | |
|---|---|---|---|
| 4,745,514 | 5/1988 | Takeshima et al. ..................... | 361/154 |
| 4,808,902 | 2/1989 | Miyazaki et al. ....................... | 318/798 |
| 4,864,284 | 9/1989 | Crayton et al. ......................... | 340/635 |
| 4,945,298 | 7/1990 | Nakashima ............................. | 318/635 |
| 5,285,141 | 2/1994 | Hwang .................................... | 318/608 |
| 5,351,439 | 10/1994 | Takeda et al. .............................. | 49/28 |
| 5,357,181 | 10/1994 | Mutoh et al. ........................... | 318/139 |
| 5,399,950 | 3/1995 | Lu et al. .................................. | 318/565 |
| 5,412,295 | 5/1995 | Maruyama et al. .................... | 318/434 |
| 5,483,135 | 1/1996 | Parks ....................................... | 318/469 |
| 5,530,329 | 6/1996 | Shigematsu et al. .................... | 318/469 |
| 5,539,290 | 7/1996 | Lu et al. ................................. | 318/565 |
| 5,661,380 | 8/1997 | Obara et al. ............................. | 318/319 |
| 5,663,713 | 9/1997 | Ironside et al. ......................... | 340/661 |
| 5,670,854 | 9/1997 | Matsuura et al. ....................... | 318/432 |
| 5,701,066 | 12/1997 | Matsuura et al. ....................... | 318/808 |

FOREIGN PATENT DOCUMENTS

| | | |
|---|---|---|
| A-5-294587 | 11/1993 | Japan . |
| A-7-286477 | 10/1995 | Japan . |
| A 2 198 860 | 6/1988 | United Kingdom . |
| A 2 267 161 | 11/1993 | United Kingdom . |
| A 2 291 225 | 1/1996 | United Kingdom . |

*Primary Examiner*—Paul Ip
*Attorney, Agent, or Firm*—Oliff & Berridge, PLC

[57] ABSTRACT

A motor drive control device, comprises: a switch which operates a motor; a motor which raises and lowers a door glass; a pulse signal generating device which synchronizes with the rotation of the motor and generates a pulse signal; and a determining device which, in a case in which there is a predetermined difference between this pulse signal and a normal pulse signal which is generated by synchronizing with the rotation of said motor, determines that the pulse signal generating device is failed. Therefore, in a case in which it is determined that the pulse signal generating device is failed and the switch is operated so that the motor raises the door glass, raising of the door glass can be stopped.

20 Claims, 16 Drawing Sheets

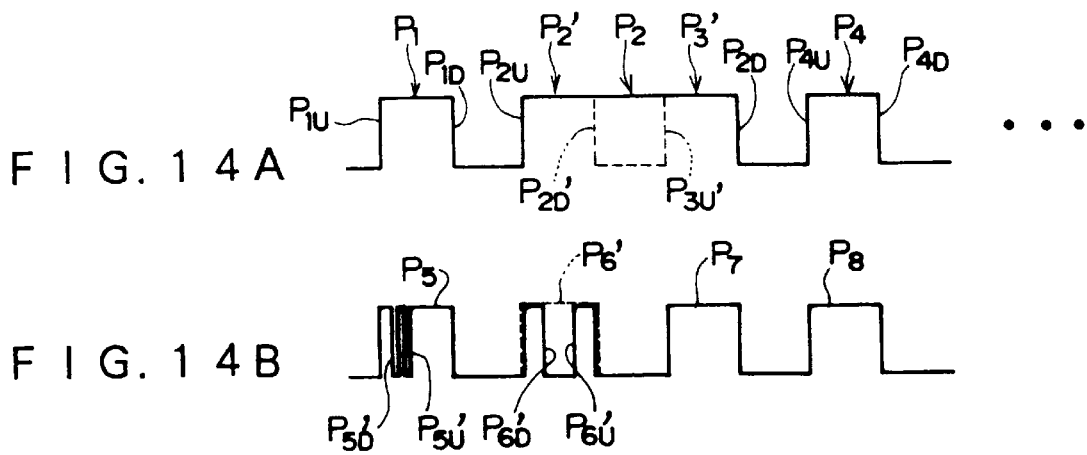
FIG. 14A
FIG. 14B
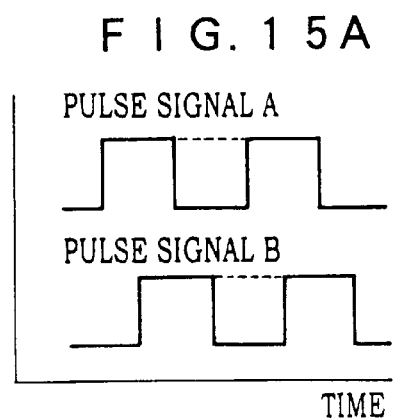
FIG. 15A
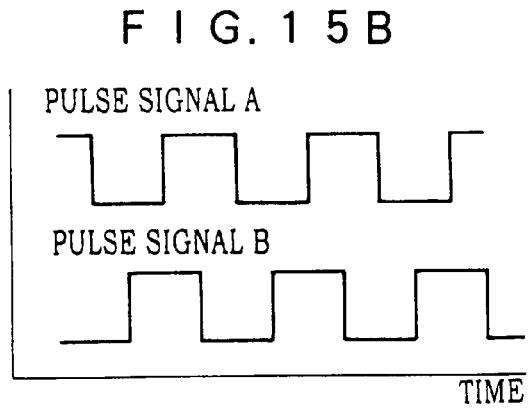
FIG. 15B

MOTOR DRIVE CONTROL DEVICE

BACKGROUND OF THE INVENTION

1. Field of the Invention

The present invention relates to a motor drive control device, and more particularly to a motor drive control device in which a motor is driven in accordance with a designation to raise and lower a raised/lowered member so that the raised/lowered member is raised and lowered.

2. Description of the Related Art

Conventionally, a motor drive control device is applied to, for example, a power window control device provided at the door of a vehicle. If the motor drive control device is applied to the power window control device in this way, a motor is used, and in accordance with the operations of a switch which designates raising and lowering of a door glass, the motor is driven so as to raise and lower the door glass. Further, in order to detect catching of a foreign object between the door glass and a window frame or the like, a pulse encoder, which synchronizes with the rotation of the motor and generates a pulse signal, is provided at the power window control device.

By calculating the amount of variation in the cycle of the pulse signal generated by the pulse encoder and by determining whether the calculated amount of variation is greater than a threshold value, a determination is made as to whether a foreign object has been caught between the door glass and the window frame. If it is determined that the foreign object has been caught therebetween, the motor is driven reversely (the door glass is lowered) by a certain amount and then stopped.

Incidentally, in order to be able to determine precisely whether the catching of a foreign object has occurred, it is assumed that a pulse signal synchronized with the rotation of the motor is generated by the pulse encoder. In the power window control device, it is not determined whether failure of the pulse encoder has occurred.

As a result, in a case in which the pulse encoder has failed and a pulse signal which is not synchronized with the rotation of the motor is generated, or in a case in which the pulse signal is not generated even if the motor rotates, a user cannot tell whether these cases are caused by the failure of the pulse encoder or by the catching of the foreign object.

Accordingly, even if the failure of the pulse encoder has occurred and a designation to raise the door glass is made, since it is not determined that the pulse encoder has failed, the operation of the door glass cannot be differentiated from the ordinary raising operation thereof.

SUMMARY OF THE INVENTION

With the aforementioned in view, an object of the present invention is to provide a motor drive control device in which when a designation to raise a raised/lowered member is made in a state in which generating means, which generates a pulse signal synchronized with the rotation of a motor, has failed, the raised/lowered member does not carry out an ordinary rising operation.

In order to achieve the above-described purpose, the first aspect is a motor drive control device, comprising: a motor which raises and lowers a raised/lowered member; designating means which designates that said raised/lowered member is raised and lowered by said motor; generating means which synchronizes with the rotation of said motor and generates a pulse signal; determining means which, in a case in which there is a predetermined difference between said pulse signal and a normal pulse signal which is generated by synchronizing with the rotation of said motor, determines that said generating means is failed; and control means which, in a case in which said determining means determines that said generating means is failed and said designating means designates that said raised/lowered member is raised, controls said motor so that the operation of said raised/lowered member is different from an ordinary raising and lowering operation.

The second aspect is a motor drive control device according to the first aspect, wherein in at least one of a case in which the pulse signal generated by said generating means is not synchronized with said normal pulse signal and a case in which the pulse signal is not generated by said generating means, said determining means is structured so as to determine that said predetermined difference exists.

The third aspect is a motor drive control device according to the second aspect, wherein in a case in which the state of the pulse signal generated by said generating means is not reversed when the state of said normal pulse signal is reversed, said determining means is structured so as to determine that said pulse signal is not synchronized with said normal pulse signal.

The fourth aspect is a motor drive control device according to the third aspect, wherein in a case in which the pulse width of the pulse signal generated by said generating means is longer than the pulse width of said normal pulse signal, said determining means is structured so as to determine that the state of the pulse signal generated by said generating means is not reversed when the state of said normal pulse signal is reversed.

The fifth aspect is a motor drive control device according to the second aspect, wherein in a case in which the pulse width of the pulse signal generated by said generating means is shorter than the pulse width of said normal pulse signal, said determining means is structured so as to determine that said pulse signal is not synchronized with said normal pulse signal.

The sixth aspect is a motor drive control device according to the fifth aspect, wherein said determining means obtains said pulse width by calculating time determined on the basis of at least one of raising and lowering of said pulse signal, and said determining means obtains said pulse width by eliminating said time which is shorter than a predetermined time, and thereafter, said determining means is structured so as to determine whether the pulse width of the pulse signal generated by said generating means is shorter the pulse width of said normal pulse signal.

The seventh aspect is a motor drive control device according to the second aspect, wherein said determining means controls said motor so that the motor which has been driven in accordance with said designation is driven reciprocally to said designation, and in a case in which the state of said pulse signal at the time of control is not changed from the state of the pulse signal before the time of control, said determining means is structured so as to determine that the pulse signal generated by said generating means is not synchronized with said normal pulse signal.

The eighth aspect is a motor drive control device according to the second aspect, wherein when said motor is driven, said determining means is structured so as to determine whether said pulse signal is generated.

The ninth aspect is a motor drive control device according to any one of the first through eighth aspects, wherein said generating means is structured by a plurality of pulse signal generating means which generate pulse signals which are synchronized with the rotation of said motor and have the same cycles and deviated phases.

The tenth aspect is a motor drive control device according to the ninth aspect, wherein in a case in which, among the plurality of pulse signals generated by said plurality of pulse signal generating means, the cycle of a pulse signal is different from the cycle of said normal pulse signal, said determining means is structured so as to determine that said predetermined difference exists.

The eleventh aspect is a motor drive control device according to the ninth aspect, wherein in a case in which a pulse signal is not generated by at least one of said plurality of pulse signal generating means, said determining means is structured so as to determine that said predetermined difference exists.

The twelfth aspect is a motor drive control device according to any one of the first through eleventh aspects, wherein said control means is structured so as to control said motor, so that raising of said raised/lowered member is stopped in a time shorter than the time in which said raised/lowered member is designated to raise by said designating means.

Here, the motor relating to the above-described first aspect raises and lowers the raised/lowered member. A designation is made by the designating means so that the raised/lowered member is raised and lowered by the motor. The pulse signal which synchronizes with the rotation of the motor is generated by the generating means.

In a case in which there is a predetermined difference between the pulse signal and the normal pulse signal which is generated by synchronizing with the rotation of the motor, the determining means determines that the generating means is failed.

In a case in which the determining means determines that the generating means is not failed, the control means controls the motor so that the raised/lowered member effects the normal raising and lowering operation in accordance with the above-described designation made by the designating means. In the ordinary raising and lowering operation, for example, in a case in which a designation to raise the raised/lowered member is made by the designating means, the motor is controlled so that the raised/lowered member is raised until a designation to stop the raised/lowered member is made. In a case in which a designation to lower the raised/lowered member is made by the designating means, the motor is controlled so that the raised/lowered member is lowered until the designation to stop the raised/lowered member is made. When the raised/lowered member is placed at a predetermined position and a designation is not made by the designating means, the designation to stop the raised/lowered member is made. Raising and lowering of the raised/lowered member is thereby stopped.

On the other hand, in a case in which it is determined by the determining means that the generating means is failed and the designation to raise the raised/lowered member is made by the designating means, the control means controls the motor so that the operation of the raised/lowered member is different from the ordinary raising and lowering operation thereof.

As an operation of the raised/lowered member which is different from the ordinary raising and lowering operation, for example, as described in the twelfth aspect, raising of the raised/lowered member may be stopped in a time shorter than the time in which a designation to raise the raised/lowered member is made by the designating means. In this way, in a case in which it is determined by the determining means that the generating means is failed and a designation to raise the raised/lowered member is made by the designating means, if raising of the raised/lowered member is stopped in a time shorter than the time in which a designation to raise the raised/lowered member is made by the designating means, the motor is not continuously driven. Accordingly, even if catching of a foreign object occurs, the load cannot be continuously imparted at the foreign object. In addition, in the operation of the raised/lowered member which is different from the ordinary raising and lowering operation, even if a designation to raise the raised/lowered member is made by the designating means, it is possible that the raised/lowered member is not raised. Also, by intermittently raising the raised/lowered member, the raised/lowered member may be raised at a speed smaller than the normal raising speed.

In a case in which there is a predetermined difference between the pulse signal and the normal pulse signal which is generated by synchronizing with the rotation of the motor, it is determined that the generating means is failed. Accordingly, in a case in which it is determined that the generating means is failed and the designation to raise the raised/lowered member is made by the designating means, the operation of the raised/lowered member can be differentiated from the ordinary raising and lowering operation thereof For example, as described in the second aspect, in at least one of the case in which the pulse signal generated by the generating means is not synchronized with the normal pulse signal (a first state) and the case in which the pulse signal is not generated by the generating means (a second state), the determining means determines that the above-described predetermined difference exists.

When the first state occurs, for example, the state of the pulse signal generated by the generating means may not be reversed when the state of the normal pulse signal is reversed. As described in the above-described third aspect, if the state of the pulse signal generated by the generating means is not reversed when the state of the normal pulse signal is reversed, i.e., so-called lack of pulse occurs, it may be determined that the pulse signal generated by the generating means is not synchronized with the normal pulse signal.

Further, if the state of the pulse signal generated by the generating means is not reversed when the state of the normal pulse signal is reversed, the pulse width of the pulse signal generated by the generating means is longer than the pulse width of the normal pulse signal. Consequently, as described in the fourth aspect, in a case in which it is determined that the pulse width of the pulse signal generated by the generating means is longer than the pulse width of the normal pulse signal, it may be determined that the state of the pulse signal generated by the generating means is not reversed when the state of the normal pulse signal is reversed.

In a case in which the first state occurs, for example, the pulse width of the pulse signal generated by the generating means may be shorter than the pulse width of the normal pulse signal. As described in the fifth aspect, in a case in which the pulse width of the pulse signal generated by the generating means is shorter than the pulse width of the normal pulse signal, i.e., so-called chattering occurs, it may be determined that the pulse signal is not synchronized with the normal pulse signal.

The above-described pulse width can be obtained by calculating the time determined on the basis of at least one of raising and lowering of the pulse signal. The time determined on the basis of raising or lowering of the pulse signal is one cycle of the pulse signal, and the time determined on the basis of raising and lowering of the pulse signal is a half cycle of the pulse signal.

In this way, when the above-described pulse width is obtained by calculating the time determined on the basis of at least one of raising and lowering of the pulse signal, for example, due to the vibrations or the like of the motor drive control device, raising and lowering of the pulse signal may occur even if the generating means is not failed. As a result, it may be mistakenly determined that the generating means is failed. Therefore, as described in the sixth aspect, the pulse width is obtained by eliminating the time which is shorter than the predetermined time, i.e., the time corresponding to the pulse width in which, even if raising and lowering occurs, it can be determined that the generating means is not failed. Thereafter, it may be determined as to whether the pulse width of the pulse signal generated by the generating means is shorter than the pulse width of the normal pulse signal.

Further, when the first state occurs, in a case in which the motor which has been driven in accordance with the above-described designation of the designating means is driven reciprocally to the designation, the state of the pulse signal is not changed from the state of the pulse signal when the motor has been driven in accordance with the above-described designation, i.e., so-called non-change in the state of the pulse signal may occur. Accordingly, as described in the seventh aspect, the motor is controlled so that the motor, which has been driven in accordance with the above-described designation of the designating means, is driven reciprocally to the designation. At the same time, in a case in which the state of the pulse signal at the time of control is not changed from the state thereof before the time of control, it may be determined that the pulse signal generated by the generating means is not synchronized with the normal pulse signal.

On the other hand, when the second state occurs, the pulse signal may not occur at the time of driving of the motor, i.e., non-generation of the pulse signal may occur. Thus, as described in the eighth aspect, when the motor is driven, a determination may be made as to whether the pulse signal is generated. In a case in which motor current flows and motor voltage is greater than or equal to the voltage at which the motor is driven regardless of the environmental condition (e.g., the state of −30° C.), it may be determined that the motor is driven, i.e., the time at which the motor is driven.

The generating means relating to the invention described above may be structured by one pulse signal generating means which synchronizes with the rotation of the motor and generates a pulse signal. As described in the ninth aspect, the generating means may be structured by a plurality of pulse signal generating means which generate pulse signals which are synchronized with the rotation of the motor and have the same cycles and deviated phases.

In a case in which the generating means is structured by the plurality of pulse signal generating means in this way, on the basis of the pulse signal from at least one of the plurality of pulse signal generating means, one of the aforementioned lack of pulse, chattering, non-change in the state of pulse signal and non-generation of the pulse signal may be determined.

As described in the tenth aspect, in a case in which, among the plurality of pulse signals generated by the plurality of pulse signal generating means, the cycle of a pulse signal is different from the cycle of the normal pulse signal, i.e., lack of pulse occurs, the determining means may determine that a predetermined difference exists. Further, as described in the eleventh aspect, in a case in which the pulse signal is not generated by at least one of the plurality of pulse signal generating means, i.e., non-generation of the pulse signal occurs, the determining means may determine that a predetermined difference exists.

BRIEF DESCRIPTION OF THE DRAWINGS

FIG. 14A is a diagram which shows a difference between a pulse signal of the first embodiment and a normal pulse signal.

FIG. 14B is a diagram which shows a difference between a pulse signal of the third embodiment and a normal pulse signal.

FIG. 15A is a diagram which shows, in a case in which a designation to raise a door glass is made, the state of a pulse signal outputted from a two-pulsed pulse encoder.

FIG. 15B is a diagram which shows, in a case in which a designation to lower the door glass is made, the state of a pulse signal outputted from the two-pulsed pulse encoder.

DESCRIPTION OF THE PREFERRED EMBODIMENTS

Figure 1:
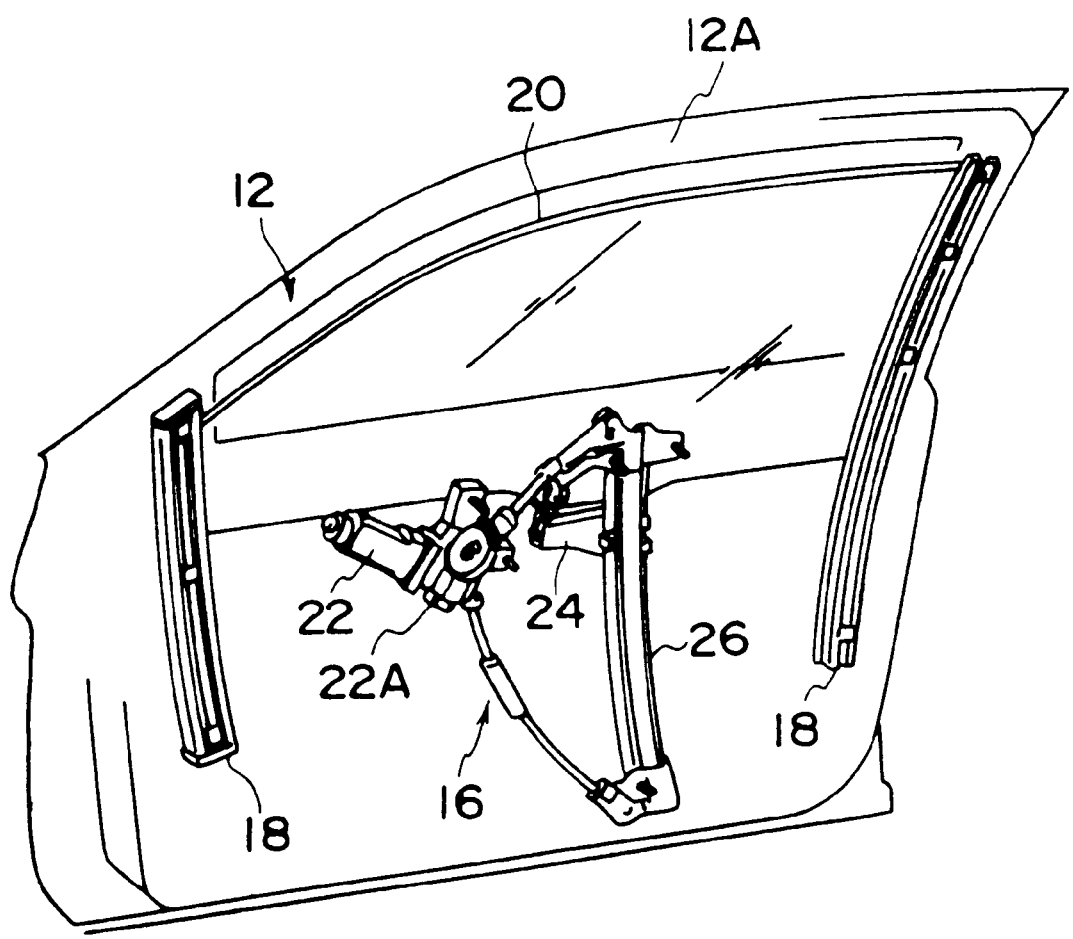
FIG. 1 is a perspective view which shows the inner structure of a driver's side door relating to a first embodiment of the present invention.

A first embodiment of the present invention will be described hereinafter in detail with reference to the drawings. As illustrated in FIG. 1, a motor drive control device of the first embodiment includes a motor 22. A window regulator portion 16 is connected to the motor 22. In the first embodiment, the window regulator portion 16 is a so-called wire type and a wire is trained around a rotating plate 22A which is mounted to a driving shaft of the motor 22. The end portion of the wire is connected to a retaining channel member 24 which supports the lower end portion of a door glass 20. Further, the retaining channel member 24 is mounted to a main guide 26 so that the retaining channel member 24 is able to move vertically. As a result, when the motor 22 rotates in the reciprocal direction, the rotational driving force thereof is transmitted to the retaining channel member 24 and the door glass 20 vertically moves along a glass guide 18. The structure of the window regulator portion 16 is not limited to such wire type, and an X-arm type or a so-called motor mobile type in which the motor itself moves along a rack may be used.

When the door glass 20 is raised by the motor 22, the peripheral end portion of the door glass 20 is fit with a rubber-made weather strip (unillustrated) within a frame 12A of a door 12 so as to close the opening of the door frame 12A. Moreover, since the motor 22 is driven to rotate, when the door glass 20 is lowered, the opening of the frame 12A of the door 12 is opened.

On the other hand, the motor 22 is operated by an auto/manual switch 34. For example, an auto/manual switch in which two stage operations are possible in both directions can be applied to the auto/manual switch 34. At one-stage operation, the motor 22 of the door 12 is driven only during the operation (manual operation). At two-stage operation, even if a user releases his/her hand from the switch, the motor 22 is driven until the door glass 20 reaches a predetermined position (until a raising or lowering lock stop occurs) (automatic operation). Moreover, the motor 22 rotates the rotating plate 22A in any of the reciprocal directions so as to be able to raise or lower the door glass 20.

Figure 2:
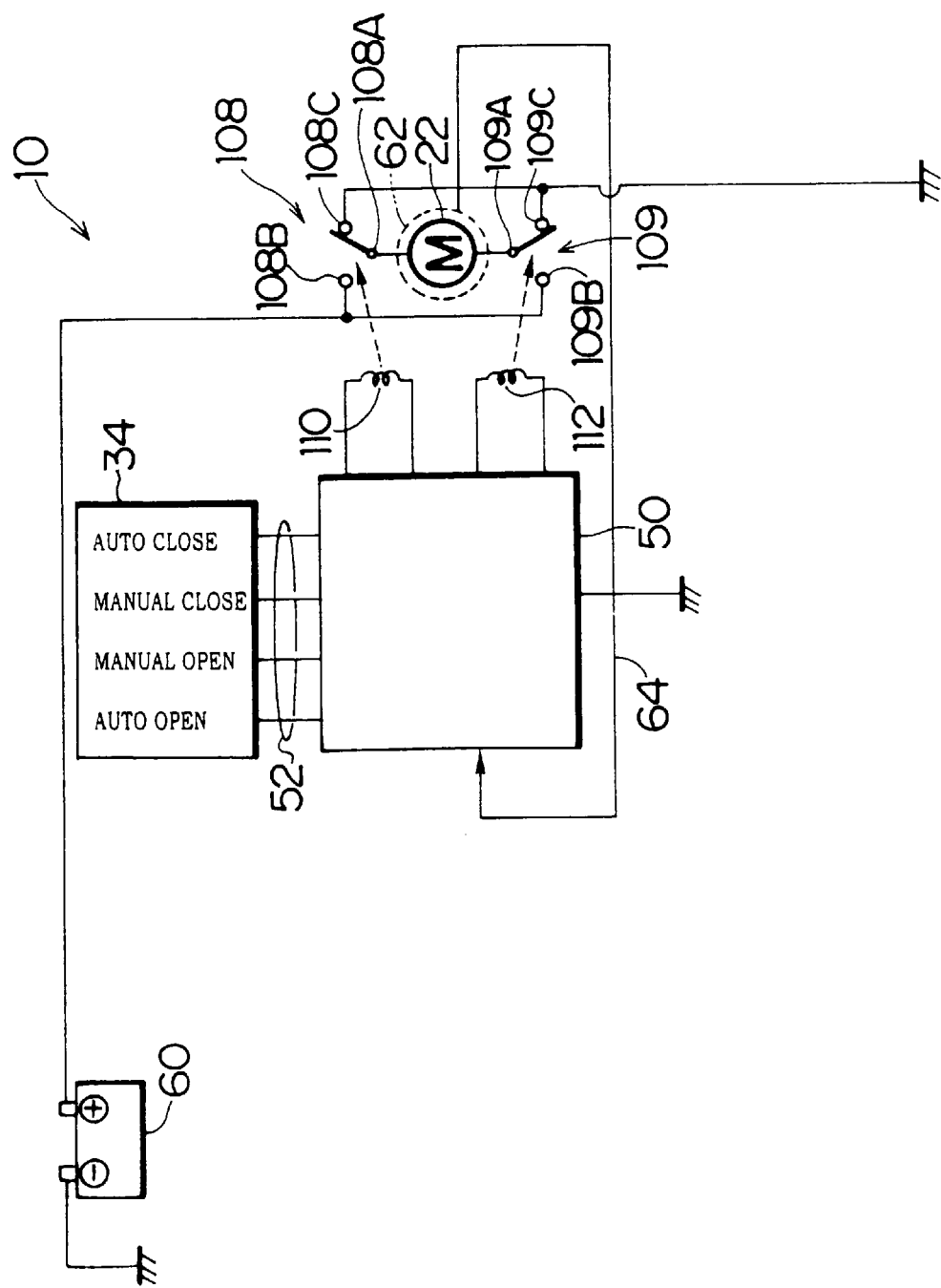
FIG. 2 is a circuit diagram of a motor drive control device relating to the first embodiment.

As shown in FIG. 2, the motor drive control device 10 includes a power window control portion 50 for controlling the driving of the motor 22 due to the operation of the auto/manual switch 34. The power window control portion 50 is formed by one chip of microcomputer. The microcomputer is formed by including an unillustrated CPU, ROM, RAM, input/output port, analog-digital (A/D) converter and $E^2$ P ROM, and these are connected to each other by buses. A moving average, which will be described later, is stored in the $E^2$ P ROM.

The motor drive control device 10 is connected to a plus terminal of a battery 60. A minus terminal of the battery 60 is grounded.

Signal lines 52 from switches of the auto/manual switch 34 are connected to the power window control portion 50.

The ends of a first relay coil 110 and a second relay coil 112 for opening and closing the door glass are connected to the power window control portion 50. In accordance with the operations of the auto/manual switch 34, the power window control portion 50 energizes any of the relay coils 110, 112.

A first relay switch 108 is disposed at the position corresponding to the first relay coil 110. A common terminal 108A of the first relay switch 108 is connected to one end of the motor 22. Further, a first contact point 108B is connected to the plus side terminal of the battery 60, and a second contact point 108C is grounded. In a case in which the first relay coil 110 is not energized, the first relay switch 108 switches the first contact point 108B to the second contact point 108C.

On the other hand, a second relay switch 109 is disposed at the position corresponding to the second relay coil 112. A common terminal 109A of the second relay switch 109 is connected to the other end of the motor 22. Further, a first contact point 109B is connected to the plus side terminal of the battery 60, and a second contact point 109C is grounded. In a case in which the second relay coil 112 is not energized, the second relay switch 109 switches the first contact point 109B to the second contact point 109C.

When the first relay coil 110 is energized, the first relay switch 108 switches the second contact point 108C to the first contact point 108B and electric current flows from one end of the motor 22 to the other end thereof. Then, the motor 22 rotates normally and the door glass moves in the closing direction. When the second relay coil 112 is energized, the second relay switch 109 switches the second contact point 109C to the first contact point 109B and electric current flows from the other end of the motor 22 to one end thereof. Then, the motor 22 rotates reversely and the door glass moves in the opening direction.

Figure 17A:
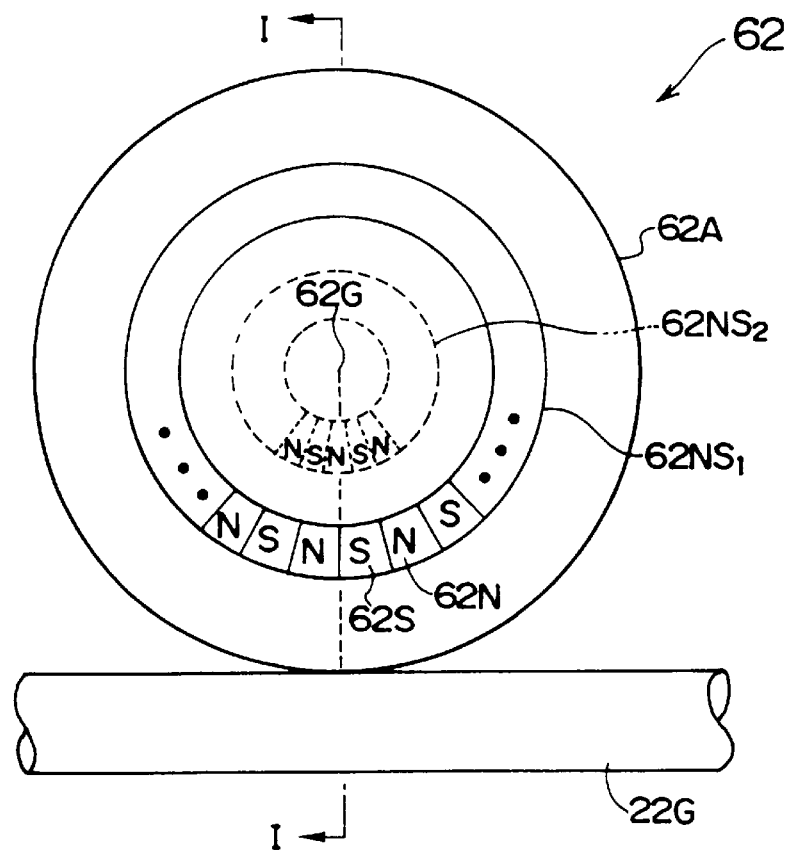
FIG. 17A is a plan view which shows the structure of the pulse encoder.
Figure 17B:
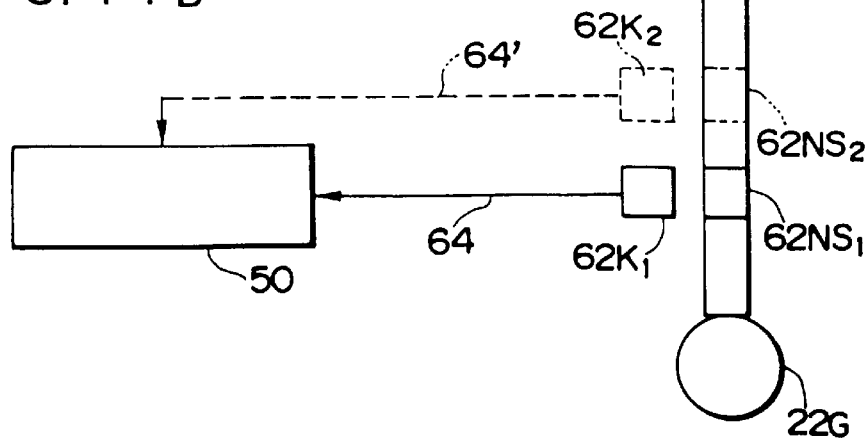
FIG. 17B is a cross sectional view, taken along line I—I, of the pulse encoder shown in FIG. 17A.

Further, a pulse encoder 62 is mounted to the motor 22. As illustrated in FIG. 17A, the pulse encoder 62 includes a rotating plate 62A which rotates around a shaft 62G in accordance with the rotation of a motor shaft 22G of the motor 22. A plurality of magnets are disposed on a concentric circle $62NS_1$ (shown by a solid line) which centers around the shaft 62G so that a plurality of south poles 62S and north poles 62N are arranged alternately. As illustrated in FIG. 17B which shows the cross sectional view, taken along line I—I, of the pulse encoder in FIG. 17A, a sensor $62K_1$ (shown by a solid line), which is connected to the power window control portion 50 and detects a line of magnetic force formed by a Hall element or the like, is disposed at the position corresponding to the concentric circle $62NS_1$. Accordingly, when the sensor $62K_1$ detects the line of magnetic force, the detection signal is inputted to the power window control device 50 via a signal line 64. As a result, in the power window control portion 50, the rotational speed of the motor 22 can be obtained on the basis of the pulse signal outputted from the pulse encoder 62. Additionally, by counting the pulse signal from the pulse encoder 62, the approximate position of the door glass 20 can be determined.

Figure 3:
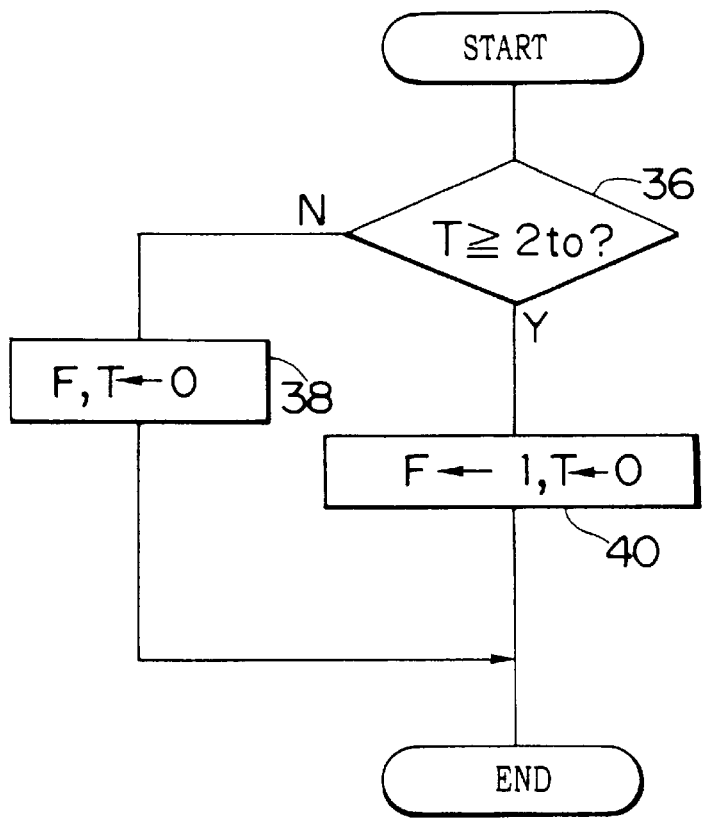
FIG. 3 is a flowchart which illustrates a failure detection processing routine relating to the first embodiment.

Next, the failure detection processing routine of the pulse encoder 62 will be explained with reference to FIG. 3. In the first embodiment, if there is a difference between the pulse signal outputted from the pulse encoder 62 and the normal pulse signal due to the occurrence of lack of pulse, it is determined that the pulse encoder 62 fails. In a state in which a designation to lower the door glass 20 is made due to the operation of the auto/manual switch 34, and when the pulse signal generated by the pulse encoder 62 is raised and lowered, the present routine starts by interrupting a main routine (see FIG. 5), which will be described later. In step 36, a determination is made as to whether a timer count value T, which has been counted as described hereinafter, is greater than or equal to $2 \cdot t_0$.

Wherein, $t_0$ is a moving average of pulse widths (a pulse width is the time in which the pulse signal is raised and lowered). In the first embodiment, the moving average $t_0$ of the pulse widths is calculated by a routine which is different from the present routine. Namely, the pulse widths are calculated and the moving average of 16 pulse widths (the number of pulse width is not limited to 16) is stored as $t_0$.

Unless $T \geq 2 \cdot t_0$, in step 38, the timer count value T and a flag F are reset. If $T \geq 2 \cdot t_0$, in step 40, the flag F is set to 1 and the timer count value T is reset.

As shown in FIG. 14A, in a case in which the pulse encoder 62 is not failed, pulse signals (normal pulse signals) $P_1$, $P_{2'}$, $P_{3'}$, $P_4$. . . which are synchronized with the rotation of the motor 22 are outputted. In this case, $t_0$ is a moving average of a time between raising $P_{1U}$ and lowering $P_{1D}$, a time between lowering $P_{1D}$ and raising $P_{2U}$, a time between raising $P_{2U}$ and lowering $P_{2D'}$, a time between lowering $P_{2D'}$, and raising $P_{3U'}$, . . . . In this way, if the pulse signal (normal pulse signal) is synchronized with the rotation of the motor 22 and generated correctly, the timer count value T corresponds to the pulse width. Thus, the timer count value T is not more than or equal to $2 \cdot t_0$.

However, in a case in which dust or the like is attached to a magnetic pole such as a north pole 62N or a south pole 62S, the sensor $62K_1$ cannot detect a line of magnetic force from the magnetic pole to which the dust or the like is attached. When the states of pulse signals (normal pulse signals) $P_{2'}$, $P_{3'}$, which are expected to generate, are reversed, the states of pulse signals are not reversed, i.e., so-called lack of pulse occurs. Namely, the pulse signal $P_{2'}$ is not lowered and the pulse signal $P_{3'}$ is not raised. If the state of the pulse signal is not reversed, the present routine does not start, and count-up continues without resetting the timer count value T to 0. As a result, the timer count value T is substantially $3 \cdot t_0$.

Consequently, by judging whether the timer count value T is greater than or equal $2 \cdot t_0$, it can be determined as to whether the states of the pulse signals $P_{2'}$, $P_{3'}$, which are expected to generate, are reversed.

Figure 4:
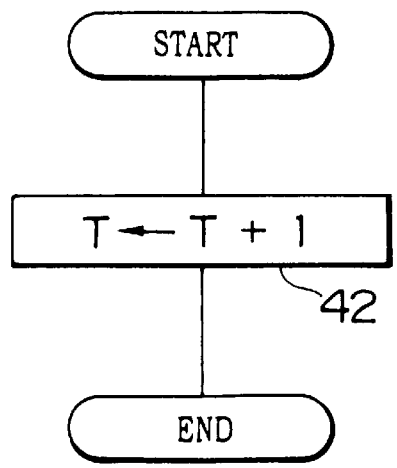
FIG. 4 is a flowchart which illustrates a count up processing routine for a count value T.

Next, a count up processing routine of the timer count value T will be explained with reference to FIG. 4. In a state in which a designation to lower the door glass 20 is made due to the operation of the auto/manual switch 34, the present routine starts every time an unillustrated pulse, which is oscillated every predetermined time, is inputted. In step 42, the timer count value T is incremented by one, and then the present routine ends.

The failure detection processing routine of the pulse encoder (FIG. 3) and the count up processing routine of the timer count value T (FIG. 4) start when the designation to lower the door glass 20 is made. If these routines are carried out while the door glass 20 is raised, in a case in which there is catching of a foreign object, the pulse width of the pulse signal becomes longer and the timer count value T is greater than or equal to $2 \cdot t_0$. Therefore, a user cannot tell whether it is caused by the failure of the pulse encoder 62 or catching of the foreign object.

Figure 5:
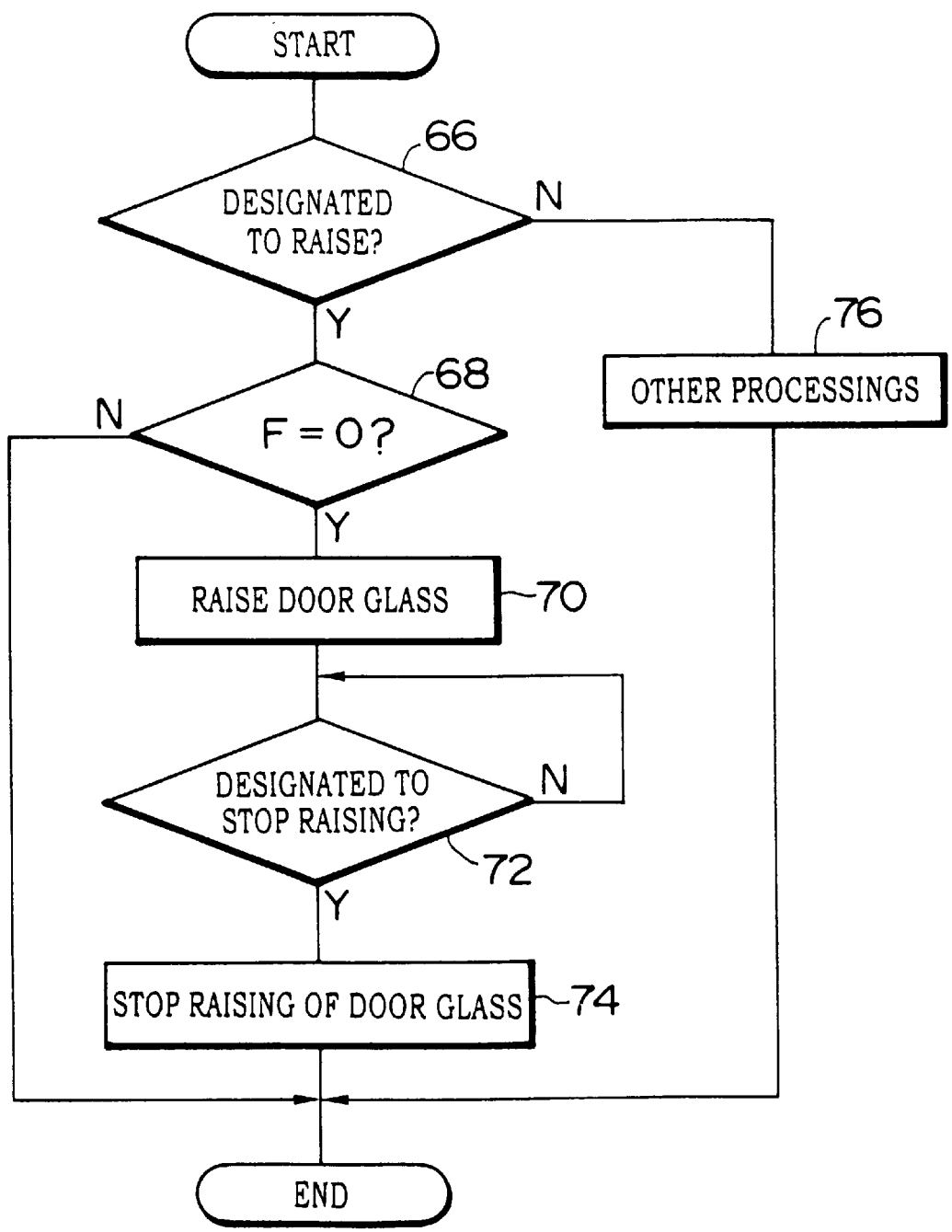
FIG. 5 is a flowchart which illustrates a main routine.

Next, a door glass raising/lowering routine (main routine) which is effected when the auto/manual switch 34 is turned on will be explained with reference to FIG. 5. In the first embodiment, catching of a foreign object is detected only when the door glass 20 is automatically raised by the auto/manual switch 34.

In step 66, on the basis of the signal from the auto/manual switch 34, a determination is made as to whether a designation to raise the door glass 20 (wherein, automatic operation) is inputted. If the designation to raise the door glass 20 is inputted, in step 68, a determination is made as to whether the flag F is reset. Accordingly, it is determined whether the failure has occurred to the pulse encoder 62. If the answer to the determination in step 68 is "No", i.e., if the designation to lower the door glass 20 is made or if the designation to raise the door glass is made due to the manual operation, in step 76, the other processings, i.e., ordinary lowering process of the door glass 20 based on the signal from the auto/manual switch 34, and raising process of the door glass (wherein, manual operation) are effected.

In a case in which the flag F is reset, the failure has not occurred to the pulse encoder 62. Thus, in step 70, the door glass 20 is raised. In step 72, the process waits until a designation to stop raising of the door glass 20 is made. Namely, if the manual operation is effected and the present routine has started, the process waits until the operation of the auto/manual switch 34 is finished. On the other hand, if the automatic operation is effected and the present routine has started, the process waits until the raising lock stop occurs. If the designation to stop the raising of the door glass 20 is made in this way, in step 74, the raising of the door glass 20 is stopped. Then, the present routine ends.

On the other hand, if the flag F is set to 1, the failure has occurred to the pulse encoder 62. Accordingly, the present routine ends. As a result, if the designation to raise the door glass 20 is inputted in a state in which the failure has occurred to the pulse encoder 62, the door glass 20 is not raised, i.e., the operation which is different from the ordinary operation can be effected.

Thus, if the timer count value T is greater than twice the value of the moving average to of the pulse widths, the flag F is set to 1 as the failure has occurred to the pulse encoder 62. In this state, if the designation to raise the door glass 20 is inputted, the door glass 20 is not raised. Accordingly, even if the designation to lower the door glass 20 is not inputted, the motor cannot be driven continuously. As a result, even if the foreign object is positioned between the door glass 20 and the door frame 12A, the door glass 20 is not raised. Therefore, load is not continuously imparted at the foreign object.

Next, a second embodiment of the present invention will be explained. Because the structure of the second embodiment is substantially similar to that of the aforementioned first embodiment, members which are the same are denoted by the same reference numerals, and descriptions thereof are omitted. Only members which are different from those of the first embodiment are explained.

Figure 6:
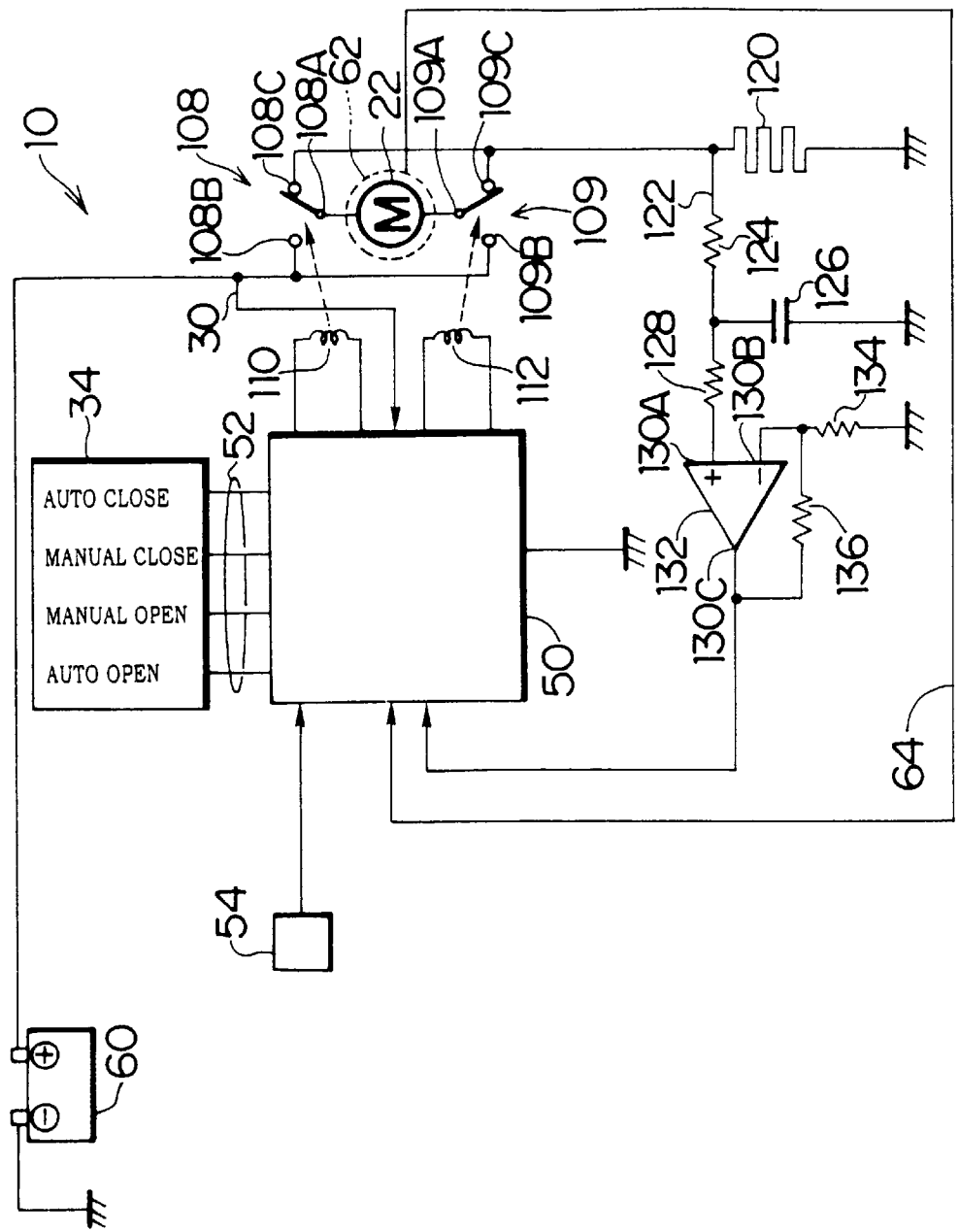
FIG. 6 is a circuit diagram of a motor drive control device relating to a second embodiment.

As illustrated in FIG. 6, means for detecting motor current is connected to a power window control portion 50 of the second embodiment. Namely, a second contact point 108C of a relay switch 108 and a second contact point 109C of a relay switch 109 are grounded via a shunt resistor 120 having a minute value of resistance (approximately 10 mΩ).

A signal line 122 is branched off from the high electric potential side of the shunt resistor 120. The signal line 122 is connected to a non-reversal input terminal 130A of an operational amplifier 132 via resistors 124, 128. One end of an electrolytic capacitor 126 is grounded, and the other end thereof is connected to a line between the resistors 124 and 128 so as to form a filter. A reversal input terminal 130B of the operational amplifier 132 is grounded via a resistor 134. An output terminal 130C of the operational amplifier 132 is connected to the reversal input terminal 130B via a feedback resistor 136 so as to form an amplifying circuit.

Further, the output terminal 130C of the operational amplifier 132 is connected to an A/D converter of the power window control portion 50, such that the power window control portion 50 can detect a motor current value.

Also, means for detecting motor voltage is connected to the power window control portion 50 of the second embodiment. Namely, one end of a line 30 is connected to the line between a first contact point 108B and a plus side terminal of a battery 60, and the other end thereof is connected to the aforementioned analog digital (A/D) converter of the power window control portion 50. Accordingly, the power window control portion 50 can detect voltage (so-called motor voltage) applied to the motor 22.

Further, a limit switch 54, which outputs a signal to the power window control portion 50 when the door glass 20 is placed in the vicinity of a fully-closed position, is connected to the power window control portion 50 of the second embodiment.

Next, the operation of the second embodiment will be explained. In the second embodiment, because a failure detection processing routine of a pulse encoder 62 is different from that of the first embodiment, the failure detection processing routine will be explained hereinafter with reference to FIG. 7. In the second embodiment, in a case there is a difference between a pulse signal from the pulse encoder 62 and a normal pulse signal due to the occurrence of non-generation of the pulse signal, it is determined that the pulse encoder 62 is failed.

The present routine starts at every predetermined time and when the auto/manual switch 34 to lower the door glass 20 is turned on. In step 78, a determination is made as to whether a signal is outputted from the limit switch 54, i.e., whether the door glass 20 is in the vicinity of a fully-closed position. As a result, when the switch to lower the door glass 20 is turned on after the raising lock stop of the door glass 20 occurs, it can be determined as to whether the present routine has started. If the answer to the determination in step 78 is "No", the present routine ends. If the answer to the determination in step 78 is "Yes", in step 80, a determination is made as to whether motor current is flowing. If the answer to the determination in step 80 is "No", the present routine ends. If the answer to the determination in step 80 is "Yes", in step 82, a determination is made as to whether the motor voltage $V_m$ is greater than or equal to $V_0$. Wherein, $V_0$ is a motor voltage at which the motor 22 drives in a case of, for example, $-30°$ C. If the answer to the determination in step 82 is "No", the present routine ends. If the answer to the determination in step 82 is "Yes", the process proceeds to step 84.

If the process goes to step 84 in this way, the motor 22 is driven, i.e., it can be determined correctly as to whether the pulse encoder 62 is failed. Namely, if the motor current flows, it can be determined that the motor 22 is connected to the battery 60. Moreover, if the motor voltage $V_m$ is greater than or equal to $V_0$, it can be determined that the motor 22 is reliably driven regardless of the environmental condition.

In step 84, a determination is made as to whether the pulse signal has not been detected within a predetermined time in which raising and lowering of the pulse signal can be detected. If the answer to the determination in step 84 is "Yes", it can be determined that, even though the motor 22 is driven, the pulse signal is not outputted from the pulse encoder 62 (non-generation of the pulse signal). Namely, because it can be determined that the failure has occurred to the pulse encoder 62, in step 86, a flag F is set to 1. Thereafter, the present routine ends.

As mentioned before, in order to determine the failure of the pulse encoder 62, it is assumed that the door glass 20 is in the vicinity of the fully-closed position. The present routine starts when the switch to lower the door glass 20 is turned on, and as previously mentioned, it is determined as to whether the pulse signal is not detected. Therefore, it is necessary to differentiate the case in which the door glass 20 is lowered, the lowering lock stop occurs and the pulse signal is not outputted from the pulse encoder 62 from the case in which a failure has occurred to the pulse encoder 62 and the pulse signal is not outputted. The present invention is not limited to this. Instead of step 78, it may be determined as to whether the door glass 20 is lowered further than the position at which the lowering lock stop does not occur during the performance of the present routine.

Further, since the present routine starts when the switch to lower the door glass 20 is turned on, it is necessary to differentiate the case in which the switch to raise the door glass 20 is turned on, the door glass 20 is raised, a foreign object is caught and the pulse signal is not outputted from the pulse encoder 62 from the case in which the failure has occurred to the pulse encoder 62 and the pulse signal is not outputted therefrom.

Next, the third embodiment of the present invention will be explained. Because the structure of the third embodiment is substantially similar to that of the aforementioned first embodiment, members which are the same are denoted by the same reference numerals, and descriptions thereof are omitted. Only members which are different from those of the first embodiment are explained.

Figure 8:
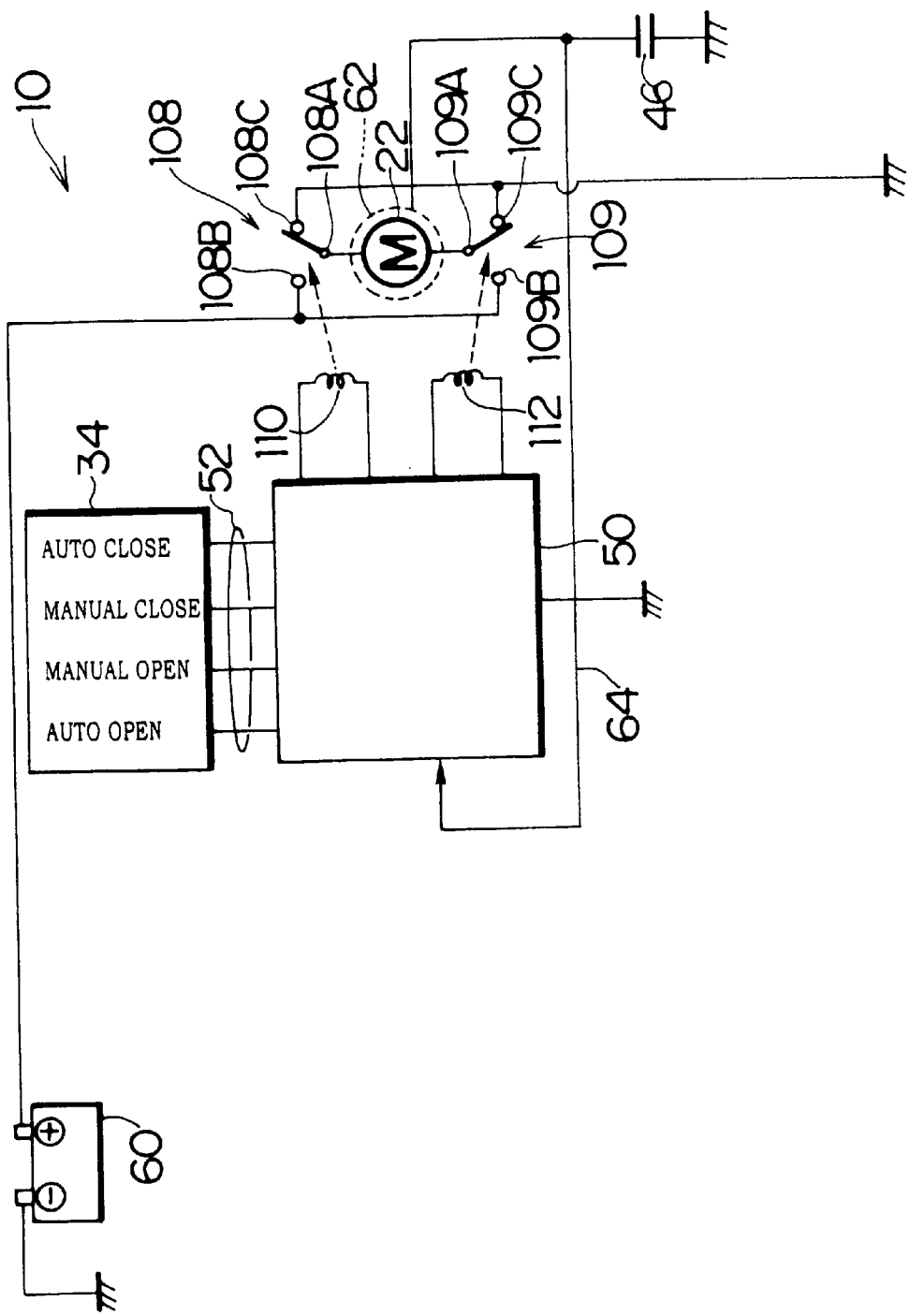
FIG. 8 is a circuit diagram of a motor drive control device relating to a third embodiment.

As illustrated in FIG. 8, one end of a capacitor 46 is connected to the line between a pulse encoder 62 and a power window control portion 50, and the other end thereof is grounded. Due to the capacitor 46, high frequency component, which will be described later, of the pulse signal outputted from the pulse encoder 62 is removed.

Figure 9:
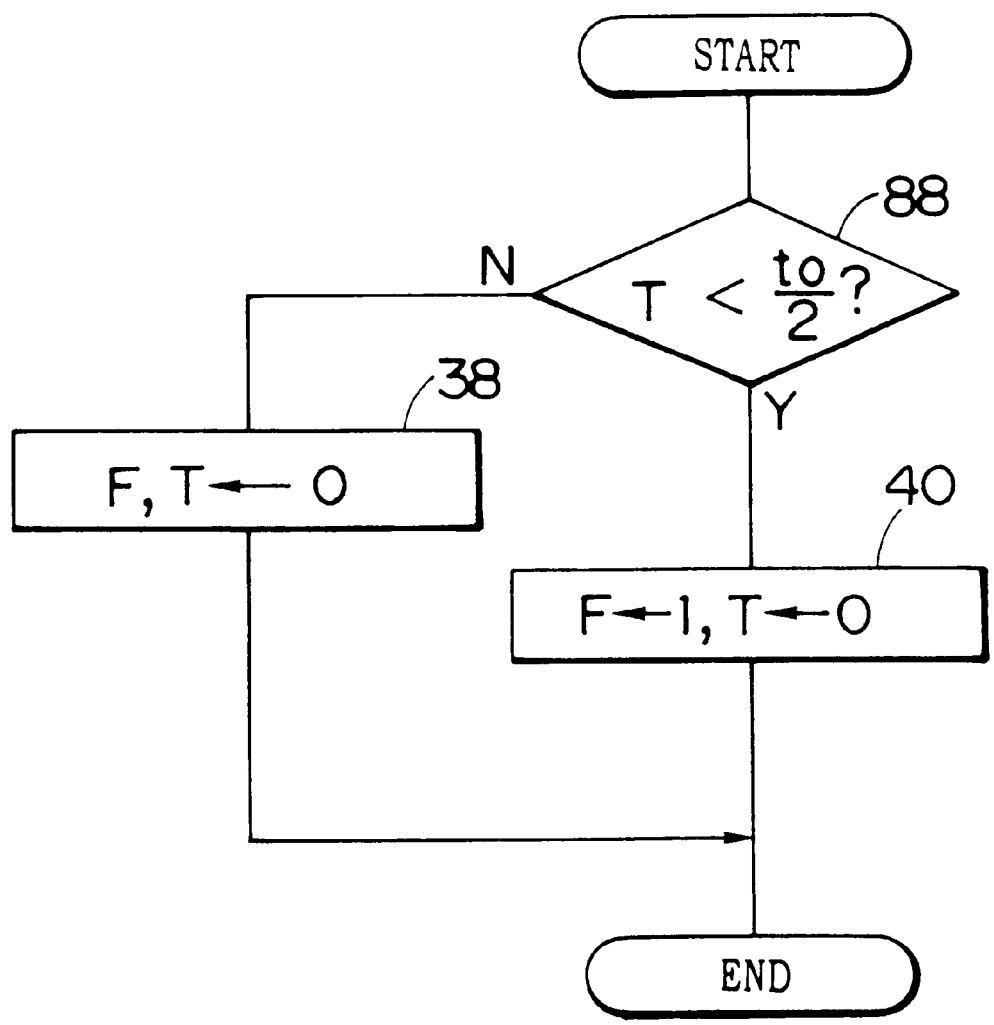
FIG. 9 is a flowchart which illustrates a failure detection processing routine relating to the third embodiment.

Next, the operation of the third embodiment will be explained. In the third embodiment, since a failure detection processing routine of the pulse encoder 62 is different from that of the first embodiment, the failure detection processing routine will be explained hereinafter with reference to FIG. 9. Because the failure detection processing routine (see FIG. 9) of the third embodiment is partially the same as the failure detection processing routine (see FIG. 3) of the first embodiment, portions which are the same are denoted by the same reference numerals and descriptions thereof are omitted. Only the portions which are different from those of the first embodiment are explained. In the third embodiment, in a case in which there is a difference between the pulse signal from the pulse encoder 62 and the normal pulse signal due to the occurrence of chattering, it is determined that the pulse encoder 62 has failed.

In a state in which a designation to lower a door glass 20 is made by an auto/manual switch 34, the present routine (see FIG. 9) starts at every predetermined time and every time raising and lowering of the pulse signal outputted from the pulse encoder 62 is detected. In step 88, a determination is made as to whether a count value T is smaller than $t_0/2$.

As shown in FIG. 14B, in a case in which the pulse encoder 62 is not failed, pulse signals (normal pulse signals) $P_5, P_6, P_7, P_8 \ldots$ which are synchronized with the rotation of the motor 22 are outputted. If the pulse signal (normal pulse signal) is generated so as to be properly synchronized with the rotation of the motor 22 in this way, the timer count value T is not smaller than $t_0/2$.

However, in a case in which dust or the like is attached to a magnetic pole such as a north pole 62N or a south pole 62S, the sensor 62K$_1$ cannot detect a line of magnetic force from the magnetic pole to which the dust or the like is attached. For example, while the pulse signal $P_{6'}$, which is to expected to generate, is high, lowering $P_{6D'}$ and raising $P_{6U'}$, occur, such that so-called chattering generates. When the so-called chattering generates in this way, there is a case in which raising and lowering of the pulse signal is detected, the present routine starts, and the timer count value T determined in step 88 is smaller than $t_0/2$. Consequently, by determining as to whether the timer count value T is smaller than $t_0/2$, it can be determined that the chattering has occurred.

In a case in which chattering has occurred in this way, it can be determined that the pulse encoder 62 is failed, and the process proceeds to step 40. In a case in which chattering has not occurred, it can be determined that the pulse encoder 62 is not failed, and the process proceeds to step 38.

As shown in the state of the pulse signal $P_5$ in FIG. 14B, there is a case in which minute chattering occurs due to vibrations or the like of the motor drive control device 10 and lowering $P_{5D}$, and raising $P_{5U}$, are outputted at high frequency. However, the high frequency component is removed by the aforementioned capacitor 46. The capacitor 46 may be omitted by ignoring the pulse width in which the timer count value T is permitted (e.g., time between the lowering $P_{5D}$, and raising $P_{5U}$) and by counting the pulse width (e.g., time between raising and lowering of the pulse signal $P_5$).

Next, the fourth embodiment of the present invention will be explained. Because the structure of the fourth embodiment is similar to that of the aforementioned first embodiment, members which are the same are denoted by the same reference numerals, and descriptions thereof are omitted.

Figure 10:
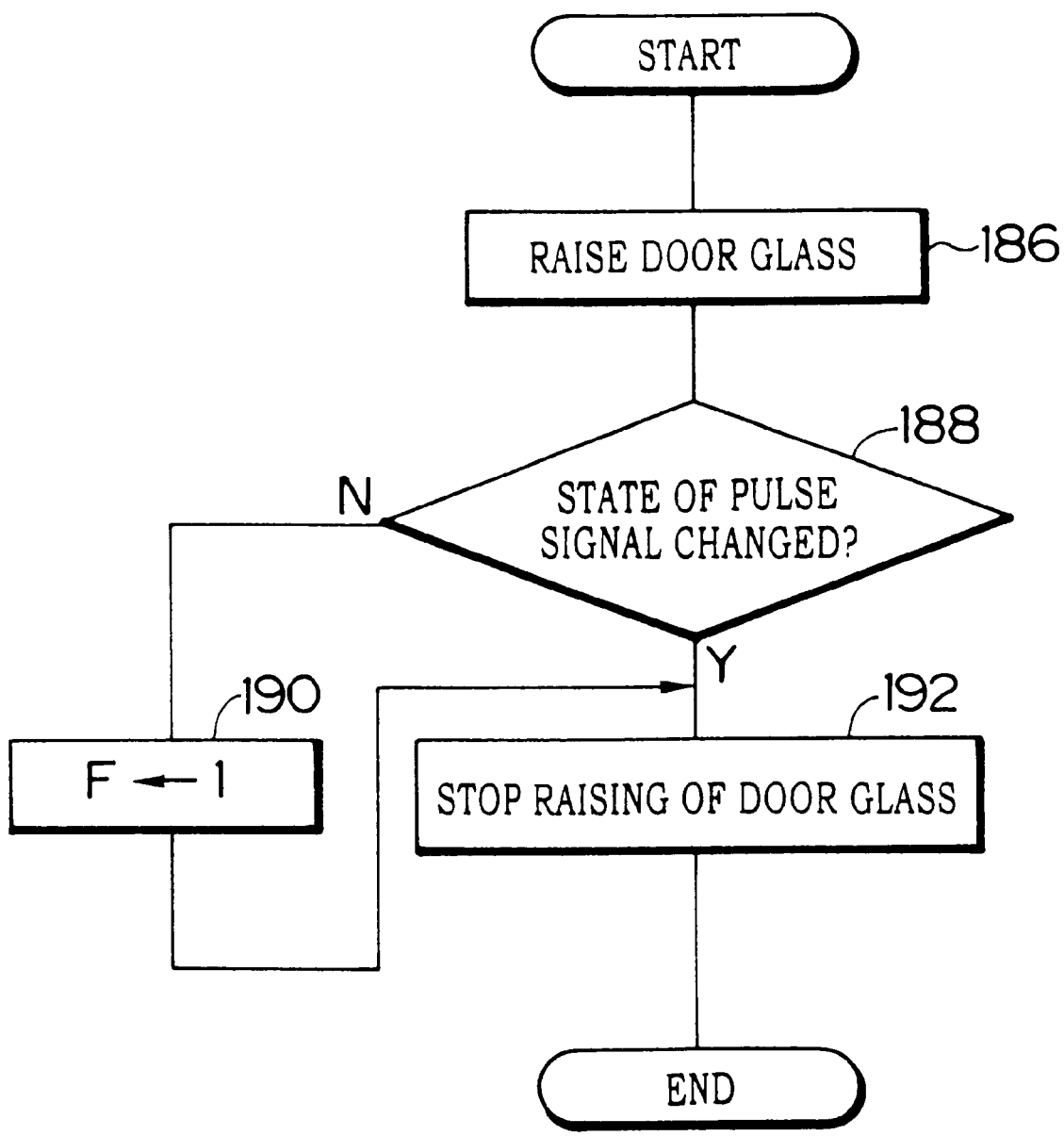
FIG. 10 is a flowchart which illustrates a failure detection processing routine relating to the fourth embodiment.

Next, the operation of the fourth embodiment will be explained. In the fourth embodiment, since a failure detection processing routine of a pulse encoder 62 is different from that of the first embodiment, the failure detection processing routine will be explained hereinafter with reference to FIG. 10. In the fourth embodiment, in a case in which there is a difference between the pulse signal from the pulse encoder 62 and the normal pulse signal due to non-change in the pulse signals, it is determined that the pulse encoder 62 has failed.

The present routine starts when the lowering lock stop occurs. In step 186, a door glass is raised. In step 188, a determination is made as to whether the state of the pulse signal has changed from the state in which the door glass is lowered. At this time, if the failure has not occurred to the pulse encoder 62, the state of the pulse signal has changed from the state in which the door glass is lowered. In this case, it can be determined that the failure has not occurred to the pulse encoder 62. In step 192, raising of the door glass is stopped, and thereafter, the present routine ends. On the other hand, when the lowering lock stop occurs and then the door glass is raised, if the failure has occurred to the pulse encoder 62, the state of the pulse signal has not changed from the state in which the door glass is lowered. In this case (non-change in the state of pulse signal), in step 190, a flag F is set to 1. The process proceeds to step 192.

In the fourth embodiment, when the lowering lock stop occurs and then the door glass is raised, it is determined as to whether non-change in the pulse signal occurs. However, the present invention is not limited to this. Non-change in the pulse signal may be determined when the raising lock stop occurs and then the door glass is lowered. Alternatively, non-change in the pulse signal may be determined when the lowering lock stop occurs and then the door glass is raised and when the raising lock stop occurs and then the door glass is lowered.

Next, the fifth embodiment of the present invention will be explained. The structure of the fifth embodiment is substantially the same as that of the first embodiment. However, it is different in that a pulse encoder 62 is a two-pulsed encoder. Namely, a plurality of magnets are disposed on two concentric circles $62NS_1$ and $62NS_2$, which center around a shaft 62G and have different radii, so that north poles 62N and south poles 62S are arranged alternately. As illustrated in FIG. 17B, sensors $62K_1$ and $62K_2$, which are connected to a power window control portion 50 and detects a pole (north pole or south pole) formed by a Hall element or the like, are disposed at the positions corresponding to the north pole N and the south pole 62S of the concentric circle $62NS_1$ and $62NS_2$.

As illustrated in FIG. 17A, the north poles 62N and the south poles 62S, which are arranged on the concentric circles $62NS_1$, $62NS_2$, deviate by a predetermined angle. As a result, the pulse signals, which are synchronized with the rotation of the motor 22 and have the same cycles and deviated phases, are outputted from the sensors $62K_1$ and $62K_2$. As a result, in a case in which a designation to raise the door glass 20 is made by the auto/manual switch 34, a pulse signal A is outputted from the sensor $62K_1$ and a pulse signal B is outputted from the sensor $62K_2$ as shown in FIG. 15A. On the other hand, in a case in which a designation to lower the door glass 20 is made, the pulse signals A, B are outputted as shown in FIG. 15B. In a case in which the failure has not occurred to the pulse encoder 62, Table 1 shows states of the pulse signal B (normal pulse signal) at the time of raising and lowering of the door glass 20 when the pulse signal (normal pulse signal) A is raised and lowered. Table 2 shows states of the pulse signal A (normal pulse signal) at the time of raising and lowering of the door glass 20 when the pulse signal (normal pulse signal) B is raised and lowered. In Tables 1 and 2, "L" indicates that the pulse signal is low and "H" indicates that the pulse signal is high.

TABLE 1

|  | At the Time of Raising of the Pulse Signal A | At the Time of Lowering of the Pulse Signal A |
|---|---|---|
| At the Time of Raising of the Door Glass | L | H |
| At the Time of Lowering of the Door Glass | H | L |

TABLE 2

|  | At the Time of Raising of the Pulse Signal B | At the Time of Lowering of the Pulse Signal B |
|---|---|---|
| At the Time of Raising of the Door Glass | H | L |
| At the time of Lowering of the Door Glass | L | H |

Figure 11:
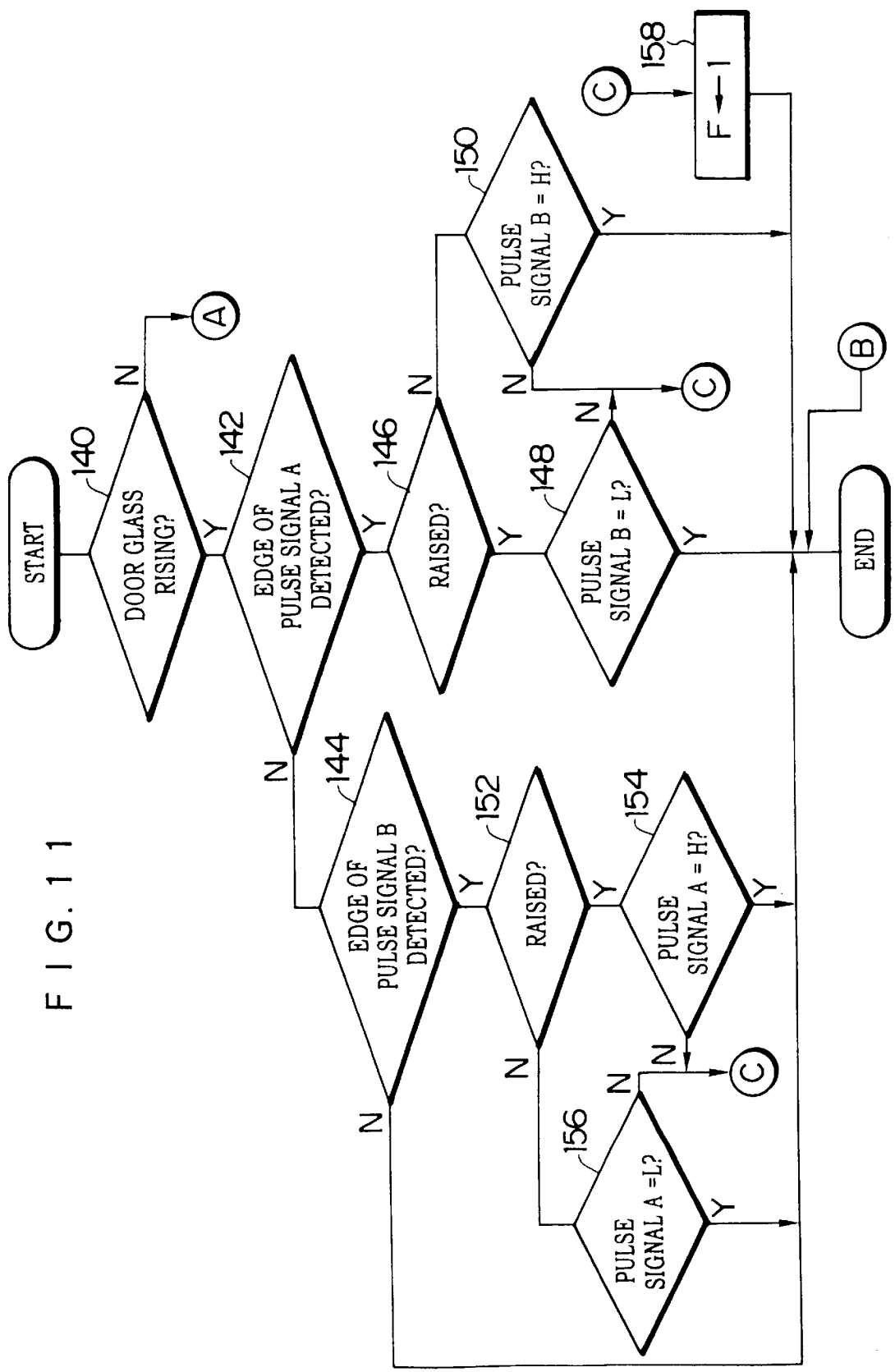
FIG. 11 is a flowchart which illustrates a portion of a failure detection processing routine relating to the fifth embodiment.

Next, the operation of the fifth embodiment will be explained. In the fifth embodiment, since a failure detection processing routine of the pulse encoder 62 is different from that of the first embodiment, the failure detection processing routine will be explained hereinafter with reference to FIGS. 11 and 12. In the fifth embodiment, in a case in which there is a difference between a pulse signal from the pulse encoder 62 and a normal pulse signal due to the occurrence of lack of pulse, it is determined that the pulse encoder 62 fails.

When an auto/manual switch 34 is turned on, the present routine (see FIG. 11) starts every time the signal from the auto/manual switch 34 is inputted and at every predetermined time. In step 140, a determination is made as to whether the door glass is rising on the basis of the signal inputted from the auto/manual switch 34. When it is determined that the door glass is rising, in step 142, a determination is made as to whether the edge of the pulse signal A (rising or lowering of the pulse signal) is detected. When the edge of the pulse signal A is not detected, in step 144, a determination is made as to whether the edge of a pulse signal B is detected. When the edge of the pulse signal B is not detected, the present routine ends. Accordingly, the edge of the pulse signal A or B is detected.

When the edge of the pulse signal A has been detected (step 142; Y), in step 146, a determination is made as to whether the raising of the pulse signal A is detected. When the raising of the pulse signal A is detected, in step 148, a determination is made as to whether the pulse signal B is low ("L").

As illustrated in FIG. 15A and Table 1, when the raising of the pulse signal A has been detected during the raising of the door glass 20, unless the pulse encoder 62 has failed, the pulse signal B is low ("L"). In this case, the present routine ends. On the other hand, as illustrated by a dotted line in FIG. 15A, in a case in which so-called lack of pulse has occurred, when the raising of the pulse signal A is detected, the pulse signal B is high ("H"). In this case, it can be determined that the pulse encoder 62 has failed. The process proceeds to step 158 where the flag F is set to 1, and then the present routine ends.

Contrary to this, as illustrated in FIG. 15A and Table 1, when the lowering of the pulse signal A has been detected during the raising of the door glass 20 (step 146; N), unless the pulse encoder 62 has failed, the pulse signal B is high ("H"). In this case (step 150; Y), the present routine ends. On the other hand, in a case in which so-called lack of pulse has occurred, the lowering of the pulse signal A is detected and the pulse signal B is low ("L"), it can be determined that the failure has occurred to the pulse encoder 62. In this case, the process proceeds to step 158 where the flag F is set to 1, and then the present routine ends.

Further, when the edge of the pulse signal B has been detected (step 142; N), steps 144 through 156 are carried out. Steps 144 through 156 are processed in the same way as the aforementioned steps 146 through 150. Namely, in a case in which so-called lack of pulse has occurred, when the pulse signal A is low ("L") (step 154, N) at the time of raising of the pulse signal B, and as illustrated by a dotted line in FIG. 15A, when the pulse signal A is high ("H") (step 156; N) at the time of lowering of the pulse signal B, the process proceeds to step 158 where the flag F is set to 1. Thereafter, the present routine ends.

Figure 12:
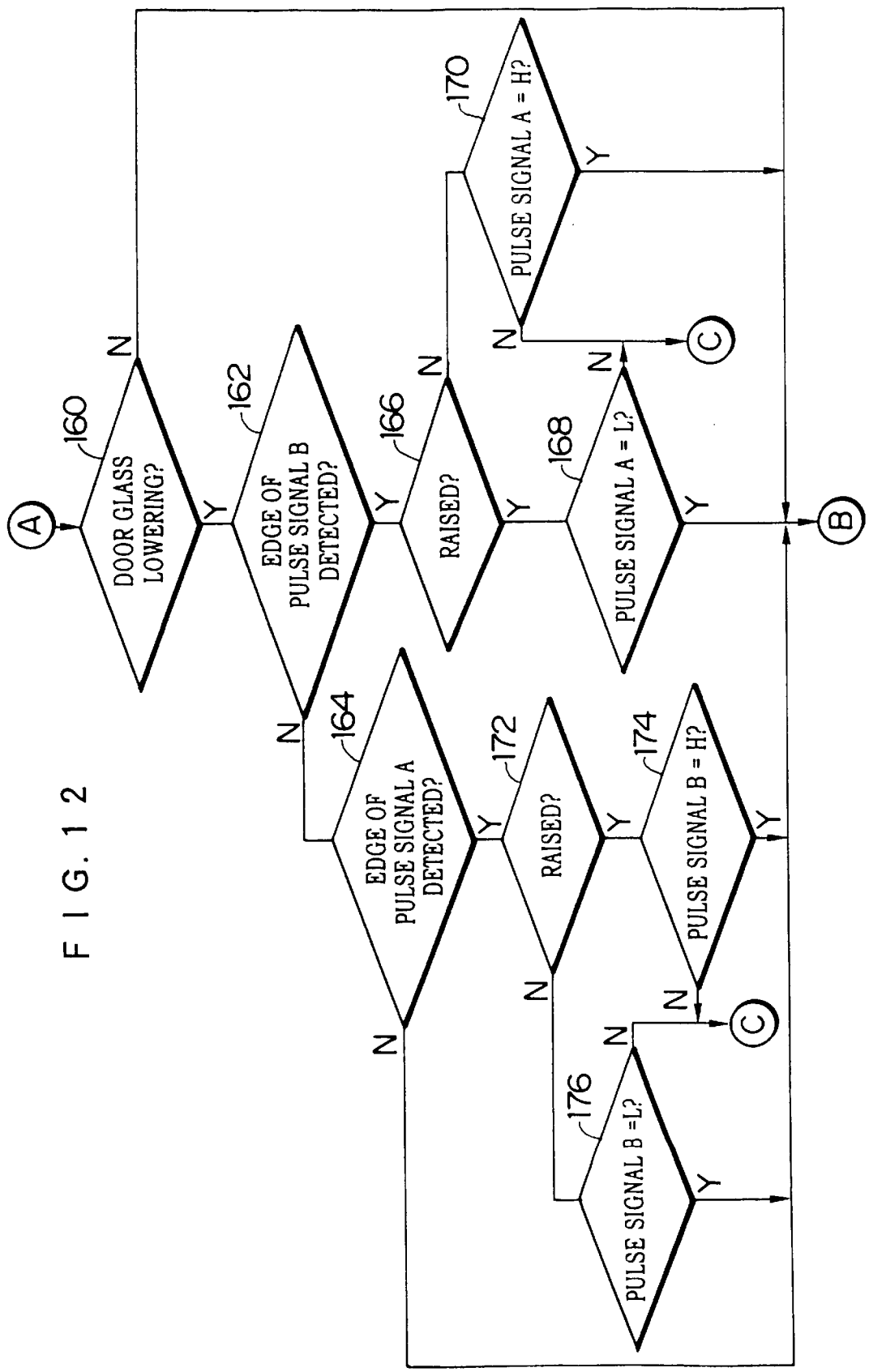
FIG. 12 is a flowchart which illustrates a remaining portion of a failure detection processing routine relating to the fifth embodiment.

Moreover, in step 140, when it is determined that the door glass 20 is not rising and that the door glass 20 is lowering (step 160; Y), steps 162 through 176 shown in FIG. 12 are carried out. Steps 162 through 176 are substantially the same as the steps 142 through 156. Instead of the pulse signal A in steps 142 through 156, the pulse signal B is used to effect steps 162 through 176. Instead of the pulse signal B in steps 142 through 156, the pulse signal A is used to effect steps 162 through 176.

Next, the sixth embodiment of the present invention will be explained. The structure of the sixth embodiment is substantially the same as that of the aforementioned second embodiment, and the structure of the pulse encoder 62 is the same as that of the aforementioned fourth embodiment.

Figure 13:
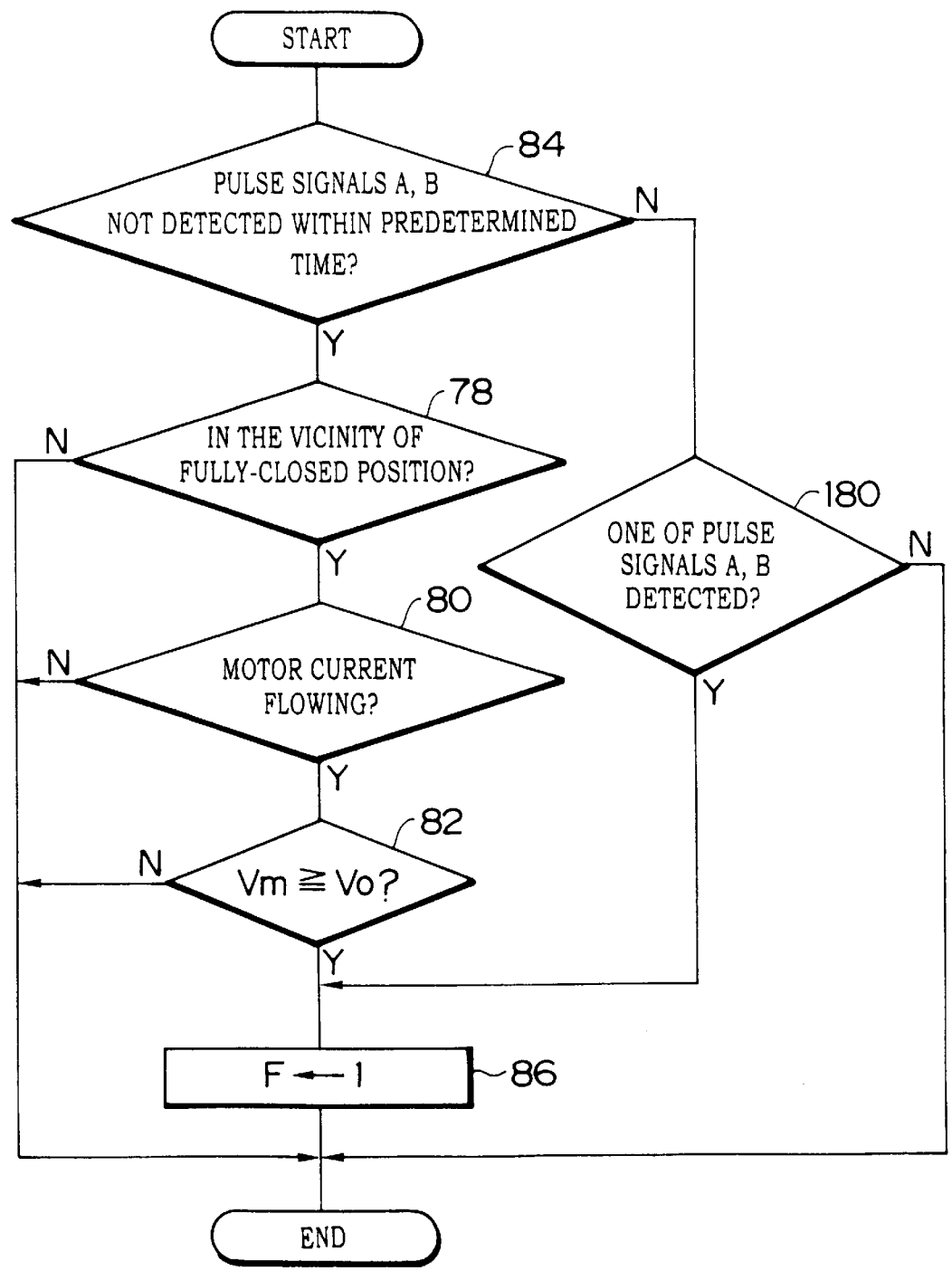
FIG. 13 is a flowchart which illustrates a failure detection processing routine relating to the sixth embodiment.

Next, the operation of the sixth embodiment will be explained. The operation of the sixth embodiment is substantially the same as that of the aforementioned second embodiment. Namely, since the portion of the failure detection processing routine of the sixth embodiment (see FIG. 13) is different from the failure detection processing routine shown in FIG. 7, members which are the same are denoted by the same reference numerals, and descriptions thereof are omitted. Only the portions which are different from the second embodiment are explained. In the sixth embodiment, in a case in which there is a difference between the pulse signal from the pulse encoder 62 and the normal pulse signal due to the occurrence of the non-generation of the pulse signal, it is determined that the pulse encoder 62 has failed.

Figure 7:
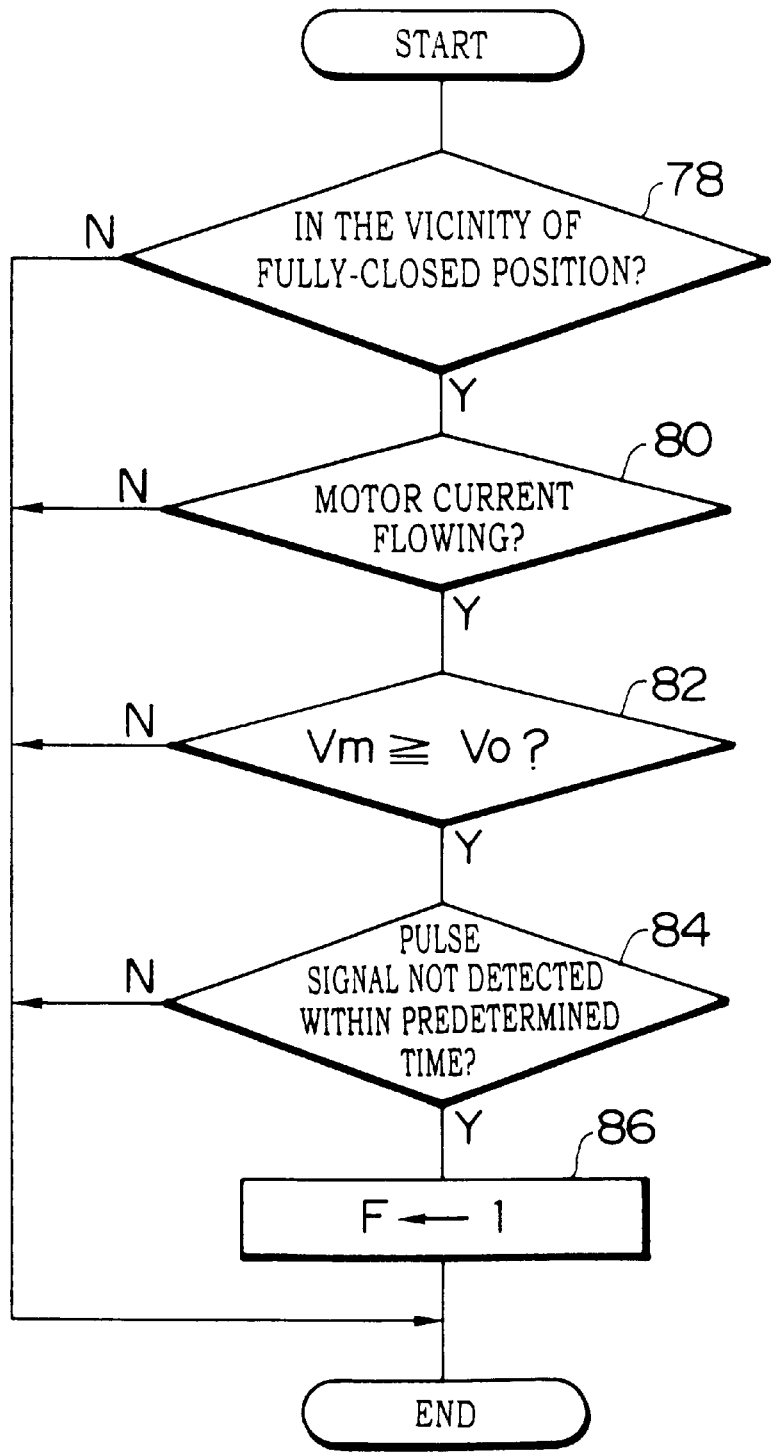
FIG. 7 is a flowchart which illustrates a failure detection processing routine relating to the second embodiment.

Similarly to the failure detection processing routine in FIG. 7, the present routine (see FIG. 13) starts at every predetermined time and when the switch to lower the door glass 20 of auto/manual switches 34 is turned on. Then, steps 84, 78, 80, 82 are carried out in succession. In step 84, in a case in which the pulse signals A, B have not been detected within a predetermined time, the process proceeds to step 180 where a determination is made as to whether any one of pulse signals A, B has been detected. When any one of pulse signals A, B has been detected, it can be determined that the failure has occurred to the pulse encoder 62. In this case, the process goes to step 86. When the answer to the determination in step 180 is "No", it can be determined that the failure has not occurred to the pulse encoder 62. In this case, the present routine ends.

In the above-described first through sixth embodiments, the failure detection processing routine in accordance with each embodiment is effected. However, the present invention is not limited to the same. It may be determined that the pulse encoder is failed in a case in which at least one of lack of pulse, non-generation of the pulse signal, chattering, and non-change in the state of the pulse signal has occurred.

Namely, the motor drive control device 10 is structured as described in the aforementioned second embodiment (see FIG. 6), and includes the capacitor 46 (see FIG. 8) of the third embodiment. In a case in which at least one of lack of pulse (see FIG. 3), non-generation of the pulse signal (see FIG. 7), chattering (see FIG. 9) and non-change in the state of pulse signal (see FIG. 10) has occurred, it may be determined that the pulse encoder is failed. Moreover, the two-pulsed pulse encoder is formed, and in a case in which at least one of lack of pulse (see FIGS. 11 and 12) and non-generation of the pulse signal (see FIG. 13) has occurred, it may be determined that the pulse encoder is failed. Also, in a case in which at least one of the lack of pulse (see FIGS. 3, 11, 12), non-generation of the pulse signal (see FIGS. 7, 13), chattering (see FIG. 9) and non-change in the state of pulse signal (see FIG. 10) has occurred, it may be determined that the pulse encoder is failed.

Figure 16:
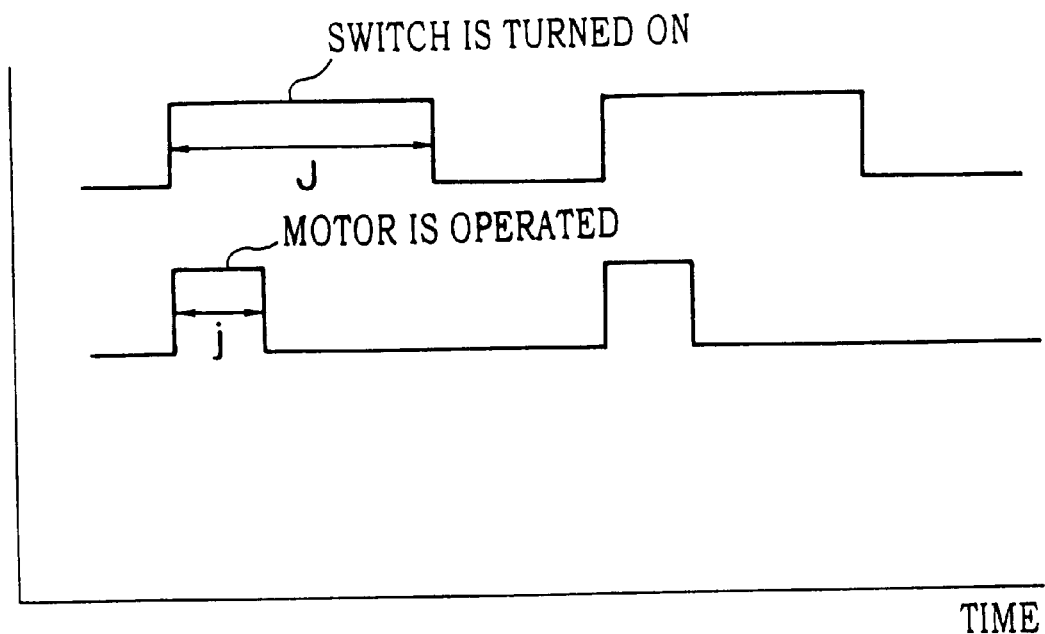
FIG. 16 is a diagram which shows a relationship between a time in which a switch, which raises the door glass, is turned on and a time in which a motor is raised(operated).

Further, in the aforementioned first through sixth embodiments and a variant example, even if it is determined that the pulse encoder 62 is failed and a designation to raise the door glass 20 is inputted, the door glass 20 is not raised. However, the present invention is not limited to the same. When the door glass 20 is raised due to the auto operation and manual operation, catching of a foreign object is detected. At the same time, if the answer to the determination in step 68 is "No", as illustrated in FIG. 16, the door glass 20 may be raised during a time j which is shorter than the time J in which the automatic operation and manual operation to raise the door glass 20 are effected. Alternatively, the speed of raising the door glass 20 is slowed down during the time J in which the automatic operation and manual operation are effected.

Figure 18:
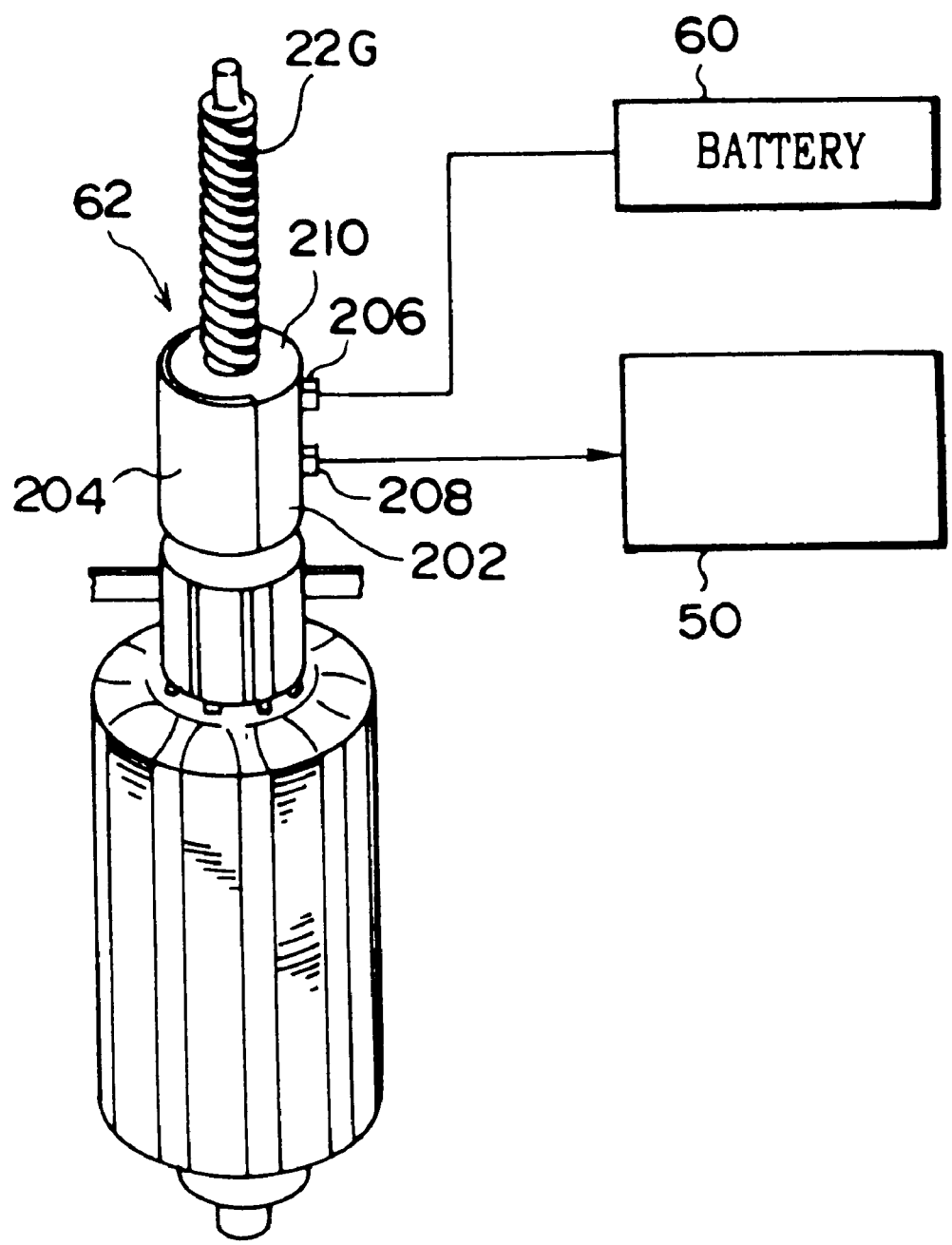
FIG. 18 is a diagram which shows the structure of another pulse encoder.

Further, in the aforementioned first through sixth embodiments, the pulse encoder for detecting a pole is used. However, the present invention is not limited to this. A sliding type pulse encoder may be used which rotates in accordance with the rotation of a motor shaft and whose contact points abut a conductor and a non-conductor which are arranged alternately. Namely, as shown in FIG. 18, a rotating portion 210, which rotates so as to synchronize with the rotation of a motor shaft 22G, is included at the motor shaft 22G of the pulse encoder 62. A conductor portion 202 is formed at a half of the peripheral portion of the rotating portion 210 and a non-conductor portion 204 is formed at the other half of the peripheral portion thereof. A first pulse electrode terminal (sliding contact point) 206 and a second pulse electrode terminal (sliding contact point) 208 are provided at the rotating portion 210 so as to contact the conductor portion 202 and the non-conductor portion 204. A battery 60 is connected to the first pulse electrode terminal 206, and a power window control portion 50 is connected to the second pulse electrode terminal 208. Two first pulse electrode terminals 206 and two second pulse electrode terminals 208 may be provided to form a two-pulsed system. In this case, the conductor portion 202 and the non-conductor portion 204 which contact one of the first pulse electrode terminal 206 and of the second pulse electrode terminal 208, and the conductor portion 202 and the non-conductor portion 204 which contact the other of the first pulse electrode terminal 206 and of the second pulse electrode terminal 208 are arranged, so that both of them center around the motor shaft 22G and are deviated by a predetermined angle.

As described hereinbefore, in a case in which there is a predetermined difference between the pulse signal from the generating means and the normal pulse signal generated by synchronizing with the rotation of the motor, it is determined that the failure has occurred to the generating means. Therefore, in a case in which it is determined that the generating means is failed and a designation to raise the raised/lowered member is effected by the designating means, the present invention achieves a superior effect in that the operation of the raised/lowered member can be differentiated from the ordinary raising/lowering operation.

What is claimed is:

1. A motor drive control device, comprising:
    a motor which raises and lowers a raised/lowered member;
    designating means which designates that said raised/lowered member is raised and lowered by said motor;
    generating means which synchronizes with the rotation of said motor and generates a pulse signal;
    determining means which compares said pulse signal with a predetermined normal pulse signal stored in a memory provided with said determining means with said predetermined normal pulse signal being generated by said generating means when said generating means is operating properly in synchronization with the rotation of said motor, and in a case in which there is a predetermined difference between said pulse signal and said normal pulse signal said determining means determines that said generating means is failed; and
    control means which, in a case in which said determining means determines that said generating means is failed and said designating means designates that said raised/lowered member is raised, controls said motor so that the operation of said raised/lowered member is different from an ordinary raising and lowering operation.

2. A motor drive control device according to claim 1, wherein in at least one of a case in which the pulse signal generated by said generating means is not synchronized with said normal pulse signal and a case in which the pulse signal is not generated by said generating means, said determining means is structured so as to determine that said predetermined difference exists.

3. A motor drive control device according to claim 2, wherein in a case in which the state of the pulse signal generated by said generating means is not reversed when the state of said normal pulse signal is reversed, said determining means is structured so as to determine that said pulse signal is not synchronized with said normal pulse signal.

4. A motor drive control device according to claim 3, wherein in a case in which the pulse width of the pulse signal generated by said generating means is longer than the pulse width of said normal pulse signal, said determining means is structured so as to determine that the state of the pulse signal generated by said generating means is not reversed when the state of said normal pulse signal is reversed.

5. A motor drive control device according to claim 2, wherein in a case in which the pulse width of the pulse signal generated by said generating means is shorter than the pulse width of said normal pulse signal, said determining means is structured so as to determine that said pulse signal is not synchronized with said normal pulse signal.

6. A motor drive control device according to claim 5, wherein said determining means obtains said pulse width by calculating time determined on the basis of at least one of raising and lowering of said pulse signal, and said determining means obtains said pulse width by eliminating said time which is shorter than a predetermined time, and thereafter, said determining means is structured so as to determine whether the pulse width of the pulse signal generated by said generating means is shorter the pulse width of said normal pulse signal.

7. A motor drive control device according to claim 2, wherein said determining means controls said motor so that the motor which has been driven in accordance with said designation is driven reciprocally to said designation, and in a case in which the state of said pulse signal at the time of control is not changed from the state of the pulse signal before the time of control, said determining means is structured so as to determine that the pulse signal generated by said generating means is not synchronized with said normal pulse signal.

8. A motor drive control device according to claim 2, wherein when said motor is driven, said determining means is structured so as to determine whether said pulse signal is generated.

9. A motor drive control device according to claim 1, wherein said generating means is structured by a plurality of pulse signal generating means which generate pulse signals which are synchronized with the rotation of said motor and have the same cycles and deviated phases.

10. A motor drive control device according to claim 2, wherein said generating means is structured by a plurality of pulse signal generating means which generate pulse signals which are synchronized with the rotation of said motor and have the same cycles and deviated phases.

11. A motor drive control device according to claim 3, wherein said generating means is structured by a plurality of pulse signal generating means which generate pulse signals which are synchronized with the rotation of said motor and have the same cycles and deviated phases.

12. A motor drive control device according to claim 9, wherein in a case in which, among the plurality of pulse signals generated by said plurality of pulse signal generating means, the cycle of a pulse signal is different from the cycle of said normal pulse signal, said determining means is structured so as to determine that said predetermined difference exists.

13. A motor drive control device according to claim 10, wherein in a case in which, among the plurality of pulse signals generated by said plurality of pulse signal generating means, the cycle of a pulse signal is different from the cycle of said normal pulse signal, said determining means is structured so as to determine that said predetermined difference exists.

14. A motor drive control device according to claim 11, wherein in a case in which, among the plurality of pulse signals generated by said plurality of pulse signal generating means, the cycle of a pulse signal is different from the cycle of said normal pulse signal, said determining means is structured so as to determine that said predetermined difference exists.

15. A motor drive control device according to claim 9, wherein in a case in which a pulse signal is not generated by at least one of said plurality of pulse signal generating means, said determining means is structured so as to determine that said predetermined difference exists.

16. A motor drive control device according to claim 10, wherein in a case in which a pulse signal is not generated by at least one of said plurality of pulse signal generating means, said determining means is structured so as to determine that said predetermined difference exists.

17. A motor drive control device according to claim 11, wherein in a case in which a pulse signal is not generated by at least one of said plurality of pulse signal generating means, said determining means is structured so as to determine that said predetermined difference exists.

18. A motor drive control device according to claim 1, wherein said control means is structured so as to control said motor, so that raising of said raised/lowered member is stopped in a time shorter than the time in which said raised/lowered member is designated to raise by said designating means.

19. A motor drive control device according to claim 2, wherein said control means is structured so as to control said motor, so that raising of said raised/lowered member is stopped in a time shorter than the time in which said raised/lowered member is designated to raise by said designating means.

20. A motor drive control device according to claim 3, wherein said control means is structured so as to control said motor, so that raising of said raised/lowered member is stopped in a time shorter than the time in which said raised/lowered member is designated to raise by said designating means.

* * * * *